US012487596B1

(12) United States Patent
Sadilek

(10) Patent No.: US 12,487,596 B1
(45) Date of Patent: Dec. 2, 2025

(54) AUTONOMOUS CONTROL OF OPERATIONS OF EARTH-MOVING VEHICLES USING DATA FROM SIMULATED VEHICLE OPERATION

(71) Applicant: AIM Intelligent Machines, Inc., Monroe, WA (US)

(72) Inventor: Adam Sadilek, Monroe, WA (US)

(73) Assignee: AIM Intelligent Machines, Inc., Redmond, WA (US)

( * ) Notice: Subject to any disclaimer, the term of this patent is extended or adjusted under 35 U.S.C. 154(b) by 347 days.

(21) Appl. No.: 18/120,264

(22) Filed: Mar. 10, 2023

Related U.S. Application Data

(60) Provisional application No. 63/350,149, filed on Jun. 8, 2022.

(51) Int. Cl.
*G05D 1/00* (2024.01)
*B66C 13/48* (2006.01)
(Continued)

(52) U.S. Cl.
CPC .......... *G05D 1/0088* (2013.01); *B66C 13/48* (2013.01); *E02F 9/205* (2013.01);
(Continued)

(58) Field of Classification Search
CPC .... G05D 1/0088; G05D 1/0094; B66C 13/48; E02F 9/205; G05B 13/0265; G05B 13/042
(Continued)

(56) References Cited

U.S. PATENT DOCUMENTS 9,288,938 B2 * 3/2016 Cavender-Bares .. A01B 69/008
9,630,321 B2 4/2017 Bradski et al.
(Continued)

FOREIGN PATENT DOCUMENTS

CN 111942200 A 11/2020
EP 3852018 A1 7/2021
(Continued)

OTHER PUBLICATIONS

Grove—12 Bit Magnetic Rotary Position Sensor (AS5600), retrieved on Aug. 22, 2022 from wiki.seeedstudio.com/Grove-12-bit-Magnetic-Rotary-Position-Sensor-AS5600/, 13 pages.
(Continued)

*Primary Examiner* — Tuan C To
*Assistant Examiner* — Dominick Mulder
(74) *Attorney, Agent, or Firm* — VLP Law Group LLP; James A. D. White

(57) ABSTRACT

Systems and techniques are described for implementing autonomous control of earth-moving construction and/or mining vehicles, including to automatically determine and control autonomous movement of part or all of one or more such vehicles (e.g., a vehicle's arm(s) and/or attachment(s), such as a digging bucket, claw, hammer, blade, etc.) to move materials or perform other actions in a manner that is based at least in part on data from simulated operation of the vehicle(s). For example, the systems/techniques may include using data from simulated operation of the earth-moving vehicle(s) in various manners, such as for use in training one or more machine learning models that are used in implementing the autonomous operations, determining optimal or otherwise preferred hardware component configurations to use, determining optimal or otherwise preferred implementation plans to use for one or more tasks
(Continued)

and/or multi-task jobs, enabling user what-if experimentation activities, etc.

23 Claims, 23 Drawing Sheets

(51) Int. Cl.
*E02F 9/20* (2006.01)
*G05B 13/02* (2006.01)
*G05B 13/04* (2006.01)

(52) U.S. Cl.
CPC ....... *G05B 13/0265* (2013.01); *G05B 13/042* (2013.01); *G05D 1/0094* (2013.01)

(58) Field of Classification Search
USPC .......................................................... 701/27
See application file for complete search history.

(56) References Cited

U.S. PATENT DOCUMENTS

| | | | |
|---|---|---|---|
| 10,935,938 B1* | 3/2021 | Bertram | G06N 3/08 |
| 11,375,041 B2 | 6/2022 | Theverapperuma et al. | |
| 11,494,930 B2 | 11/2022 | Theverapperuma et al. | |
| 11,560,690 B2 | 1/2023 | Halder et al. | |
| 11,567,197 B2 | 1/2023 | Halder | |
| 11,577,741 B1* | 2/2023 | Reschka | B60W 30/0953 |
| 11,592,822 B2* | 2/2023 | Vandike | B60K 35/80 |
| 11,853,068 B1* | 12/2023 | Agarwal | G05D 1/0088 |
| 12,099,357 B1* | 9/2024 | Ebrahimi Afrouzi | G05D 1/0214 |
| 12,178,158 B2* | 12/2024 | Vandike | B60K 35/00 |
| 2018/0329411 A1* | 11/2018 | Levinson | G08G 1/166 |
| 2019/0033861 A1* | 1/2019 | Groden | G05D 1/0055 |
| 2019/0118829 A1* | 4/2019 | Goldberg | B60W 60/001 |
| 2019/0127985 A1* | 5/2019 | Dundorf | E01H 5/06 |
| 2019/0129436 A1 | 5/2019 | Sun et al. | |
| 2019/0310654 A1* | 10/2019 | Halder | B60W 60/00 |
| 2019/0367025 A1* | 12/2019 | Pathak | B60W 40/04 |
| 2020/0024828 A1* | 1/2020 | Asada | E02F 3/437 |
| 2020/0057453 A1* | 2/2020 | Laws | G08G 1/22 |
| 2020/0111169 A1 | 4/2020 | Halder et al. | |
| 2020/0150650 A1 | 5/2020 | Jarlengrip | |
| 2020/0150687 A1 | 5/2020 | Halder et al. | |
| 2020/0310442 A1 | 10/2020 | Halder et al. | |
| 2021/0017738 A1 | 1/2021 | Sano | |
| 2021/0191409 A1 | 6/2021 | Ready-Campbell et al. | |
| 2021/0223774 A1* | 7/2021 | Zhang | G05D 1/0088 |
| 2021/0254308 A1 | 8/2021 | Thibblin et al. | |
| 2021/0286924 A1 | 9/2021 | Wyrwas et al. | |
| 2021/0317633 A1 | 10/2021 | Sherlock | |
| 2021/0326606 A1* | 10/2021 | Dolinar | G05D 1/81 |
| 2022/0024485 A1 | 1/2022 | Theverapperuma et al. | |
| 2022/0026921 A1 | 1/2022 | Halder | |
| 2022/0042286 A1 | 2/2022 | Tsuji et al. | |
| 2022/0057513 A1 | 2/2022 | Pihl | |
| 2022/0154431 A1 | 5/2022 | Kurosawa | |
| 2022/0340171 A1 | 10/2022 | Halder | |
| 2023/0053964 A1* | 2/2023 | Wang | E02F 3/439 |
| 2023/0071015 A1* | 3/2023 | Wu | E02F 3/437 |
| 2023/0134855 A1 | 5/2023 | Hodel et al. | |
| 2023/0256994 A1* | 8/2023 | Stumpf | B60W 60/00 701/26 |

FOREIGN PATENT DOCUMENTS

| | | |
|---|---|---|
| EP | 4083335 A2 | 8/2022 |
| WO | 2018099755 A1 | 6/2018 |
| WO | 2021/101241 A1 | 5/2021 |
| WO | 2021/241716 A1 | 12/2021 |
| WO | 2022198331 A1 | 9/2022 |

OTHER PUBLICATIONS

ZED-F9P-04B u-blox F9 high precision GNSS module, May 3, 2022, retrieved on Aug. 22, 2022 from www.u-blox.com/sites/default/files/ZED-F9P-04B_DataSheet_UBX-21044850.pdf, 25 pages.
Digi XBee SX 868 Datasheet, retrieved on Aug. 22, 2022 from www.digi.com/resources/library/data-sheets/ds_xbee-sx-868, 2 pages.
St LM217/LM317 Datasheet, Dec. 2021, retrieved on Aug. 22, 2022 from www.st.com/resource/en/datasheet/lm317.pdf, 34 pages.
St LD1117 Datasheet, Feb. 2020, retrieved on Aug. 22, 2022 from www.st.com/resource/en/datasheet/ld1117.pdf, 46 pages.
Texas Instruments TCAN33x 3.3-V CAN Transceivers With CAN FD, Dec. 2019, retrieved on Aug. 22, 2022 from www.ti.com/lit/gpn/TCAN334, 45 pages.
PJRC Teensy 4.1 Development Board, retrieved on Mar. 18, 2022 from www.pjrc.com/store/teensy41.html, 22 pages.
Fairchild Semiconductor ONSEMI N-Channel Logic Level Enhancement Mode Field Effect Transistor BSS138, Nov. 2021, retrieved on Aug. 22, 2022 from www.onsemi.com/pdf/datasheet/bss138-d.pdf, 7 pages.
NXP Semiconductors i.MX RT1060 Crossover MCU with Arm® Cortex®-M7 Core, retrieved on Aug. 22, 2022 from https://www.nxp.com/products/processors-and-microcontrollers/arm-microcontrollers/i-mx-rt-crossover-mcus/i-mx-rt1060-crossover-mcu-with-arm-cortex-m7-core:i.MX-RT1060, 9 pages.
LIVOX LVX Specifications v1.1.0.0, 2019, retrieved on Aug. 22, 2022 from www.livoxtech.com/3296f540ecf5458a8829e01cf429798e/downloads/Livox Viewer/LVX Specifications EN_20190924.pdf, 12 pages.
Inductive Proximity Sensor LJ12A3-4-Z/BX, retrieved on Aug. 22, 2022 from datasheetspdf.com/pdf-file/1096182/ETT/LJ12A3-4-Z/1, 1 page.
Brianna Wessling, "Teleo announces $12M in Series A funding", Jun. 13, 2022, retrieved on Jun. 20, 2022 from www.therobotreport.com/teleo-announces-12m-in-series-a-funding/, 10 pages.
Frank Tobe, "Blue River Technology sells to Deere for $305 million", Sep. 7, 2017, retrieved on Jun. 20, 2022 from www.therobotreport.com/startup-blue-river-technology-sells-deere-305-million/, 12 pages.
Steve Crowe, "John Deere Acquires Light's Camera-Based Perception Platform", May 19, 2022, retrieved on Jun. 20, 2022 from www.therobotreport.com/john-deere-acquires-light-camera-based-perception-platform/, 12 pages.
TRL Off-Highway Automated Vehicles Code Of Practice, 2021, retrieved on Aug. 22, 2022 from trl.co.uk/uploads/trl/documents/PPR994-Off-Highway-AV-CoP_v3.pdf, 40 pages.
Steve Crowe, "John Deere Acquiring Bear Flag Robotics For $250M", Aug. 5, 2021, retrieved on Jun. 20, 2022 from www.therobotreport.com/john-deere-acquiring-bear-flag-robotics-250m/, 11 pages.
Steve Crowe, "Oxbotica Pilots Safety Framework For Off-Road Autonomous Driving", Jun. 7, 2021, retrieved on Jun. 20, 2022 from www.therobotreport.com/oxbotica-pilots-safety-framework-off-road-autonomous-driving/, 11 pages.
Brianna Wessling, "MIT Researchers Help Robots Navigate Uncertain Environments", May 24, 2022, retrieved on Jun. 20, 2022 from www.therobotreport.com/mit-researchers-help-robots-navigate-uncertain-environments/, 10 pages.
Carnegie Mellon University National Robotics Engineering Center—Off-Road Autonomy, retrieved on Aug. 22, 2022 from https://www.nrec.ri.cmu.edu/solutions/defense/other-projects/off-road-autonomy.html, 5 pages.
Greg Nichols, "Off Road: Autonomous Driving's New Frontier Requires A New Kind Of Sensor", Apr. 14, 2021, retrieved on Jun. 20, 2022 from www.zdnet.com/article/off-road-autonomous-drivings-new-frontier-requires-a-new-kind-of-sensor/, 15 pages.
Tagolas Magma X2 Datasheet, retrieved on Aug. 22, 2022 from www.taoglas.com/datasheets/AA.175.301111.pdf, 20 pages.
LIVOX Mid-40/Mid-100 LiDAR Specs, retrieved on Aug. 22, 2022 from https://www.livoxtech.com/mid-40-and-mid-100/specs, 2 pages.
Elaine Ball, "Top Benefits Of Using LiDAR For Construction Projects", Oct. 1, 2020, retrieved from https://csengineermag.com/top-benefits-of-using-lidar-for-construction-projects/ on Nov. 4, 2022, 4 pages.

(56) References Cited

OTHER PUBLICATIONS

"Press Release: Baraja Announces First Volume Commercial LiDAR Deal With Hitachi Construction Machinery", Oct. 12, 2021, retrieved from https://www.baraja.com/en/blog/press-release-baraja-announces-first-volume-commercial-lidar-deal-with-hitachi-construction on Nov. 4, 2022, 6 pages.

Peter Brown, "LiDAR Improves Efficiency And Safety In Industrial Heavy Equipment", Oct. 22, 2021, retrieved from https://electronics360.globalspec.com/article/17336/lidar-improves-efficiency-and-safety-in-industrial-heavy-equipment on Nov. 4, 2022, 2 pages.

"Construction Remains Ahead In Autonomous Vehicles", Oct. 4, 2019, retrieved from https://www.constructionequipment.com/earthmoving/rigid-frame-trucks-off-highway/article/10756443/construction-remains-ahead-in-autonomous-vehicles on Nov. 4, 2022, 4 pages.

"LiDAR For Heavy Machinery", retrieved from https://innoviz.tech/applications/industrial on Nov. 4, 2022, 2 pages.

"Hitachi Construction Machinery Invests In Nextgen LiDAR . . . ", Mar. 29, 2021, retrieved from https://lidarnews.com/press-releases/hitachi-construction-machinery-invests-in-nextgen-lidar/ on Nov. 4, 2022, 2 pages.

Nakagawa et al., "Real-Time Mapping Of Construction Workers Using Multilayered LiDAR", The 40th Asian Conference On Remote Sensing 2019, Oct. 14-18, 2019, 8 pages.

Sabbir Rangwala, "LiDAR Vision—Helping Bring Autonomous Trucks To Your Neighborhood", Dec. 17, 2020, retrieved from https://www.forbes.com/sites/sabbirrangwala/2020/12/17/lidar-visionhelping-bring-autonomous-trucks-to-your-neighborhood/ on Nov. 4, 2022, 9 pages.

"Collision Warning On The Rear Of An Excavator With 3D LiDAR Sensors", retrieved from https://www.sick.com/ca/en/industries/mobile-automation/construction-and-mining-machines/excavator/collision-warning-on-the-rear-of-an-excavator-with-3d-lidar-sensors/c/p549945 on Nov. 4, 2022, 1 page.

"Autonomous Construction Vehicles", retrieved from https://www.technologycards.net/english/the-technologies/autonomous-construction-vehicles on Nov. 4, 2022, 2 pages.

\* cited by examiner

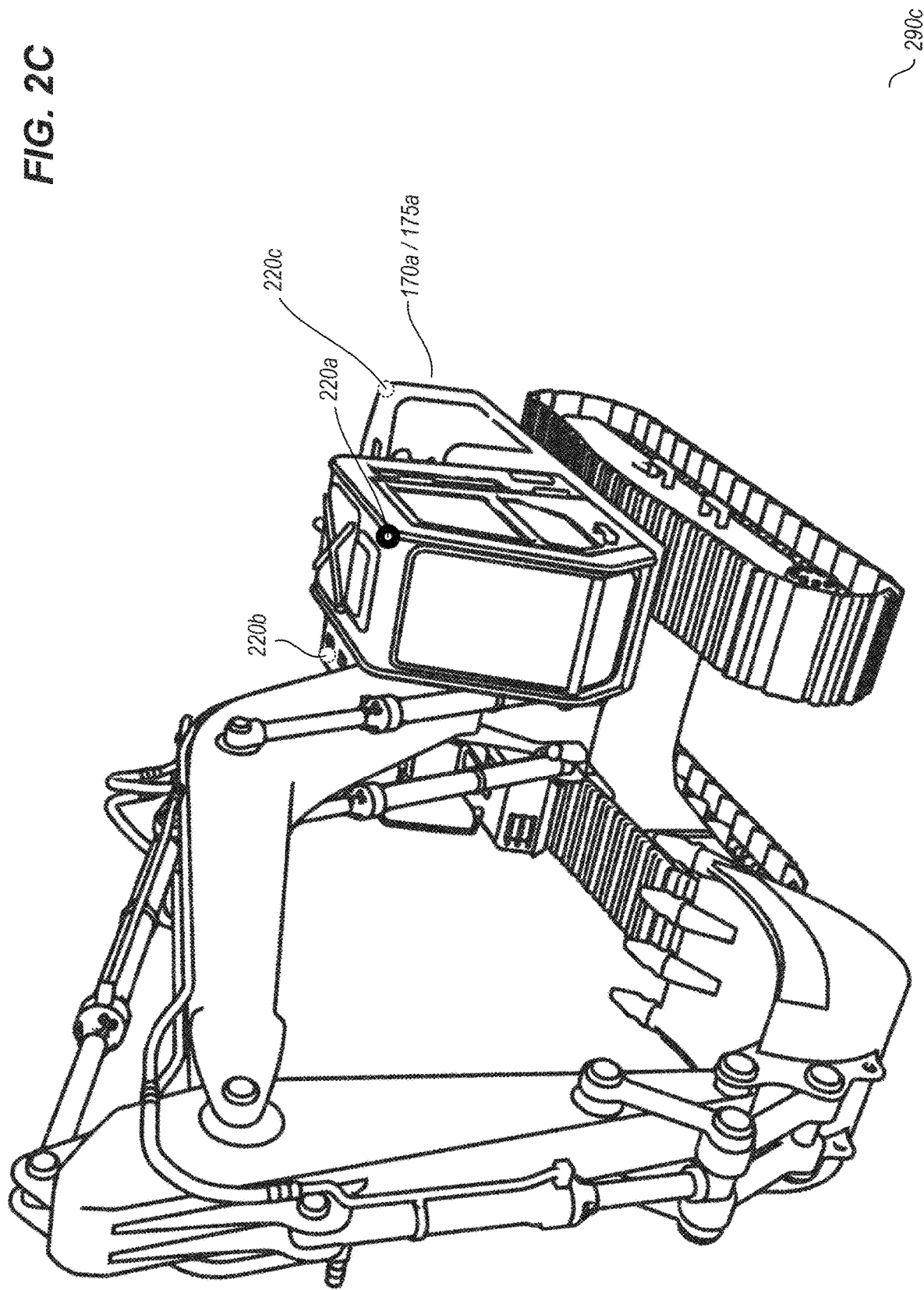

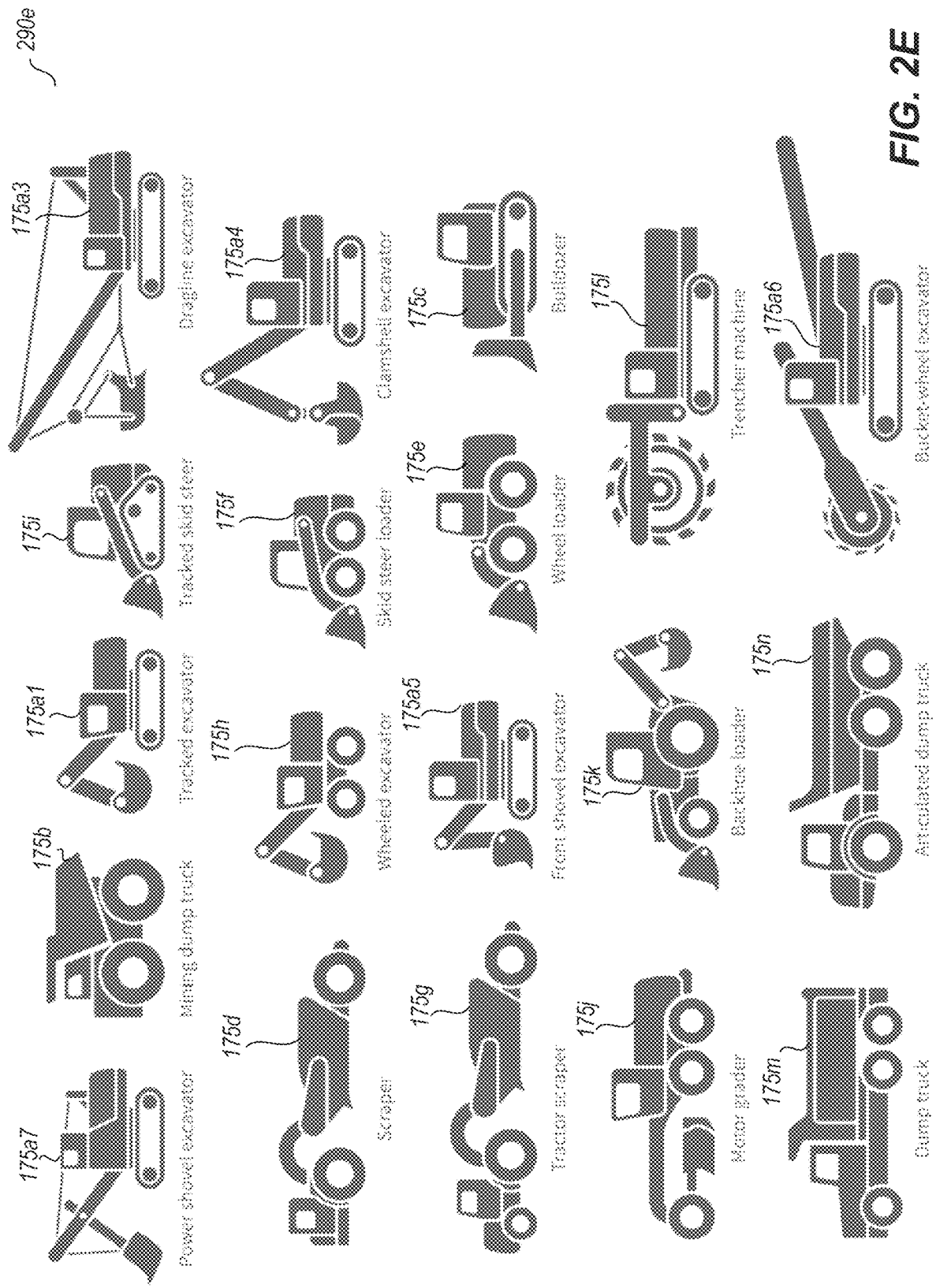

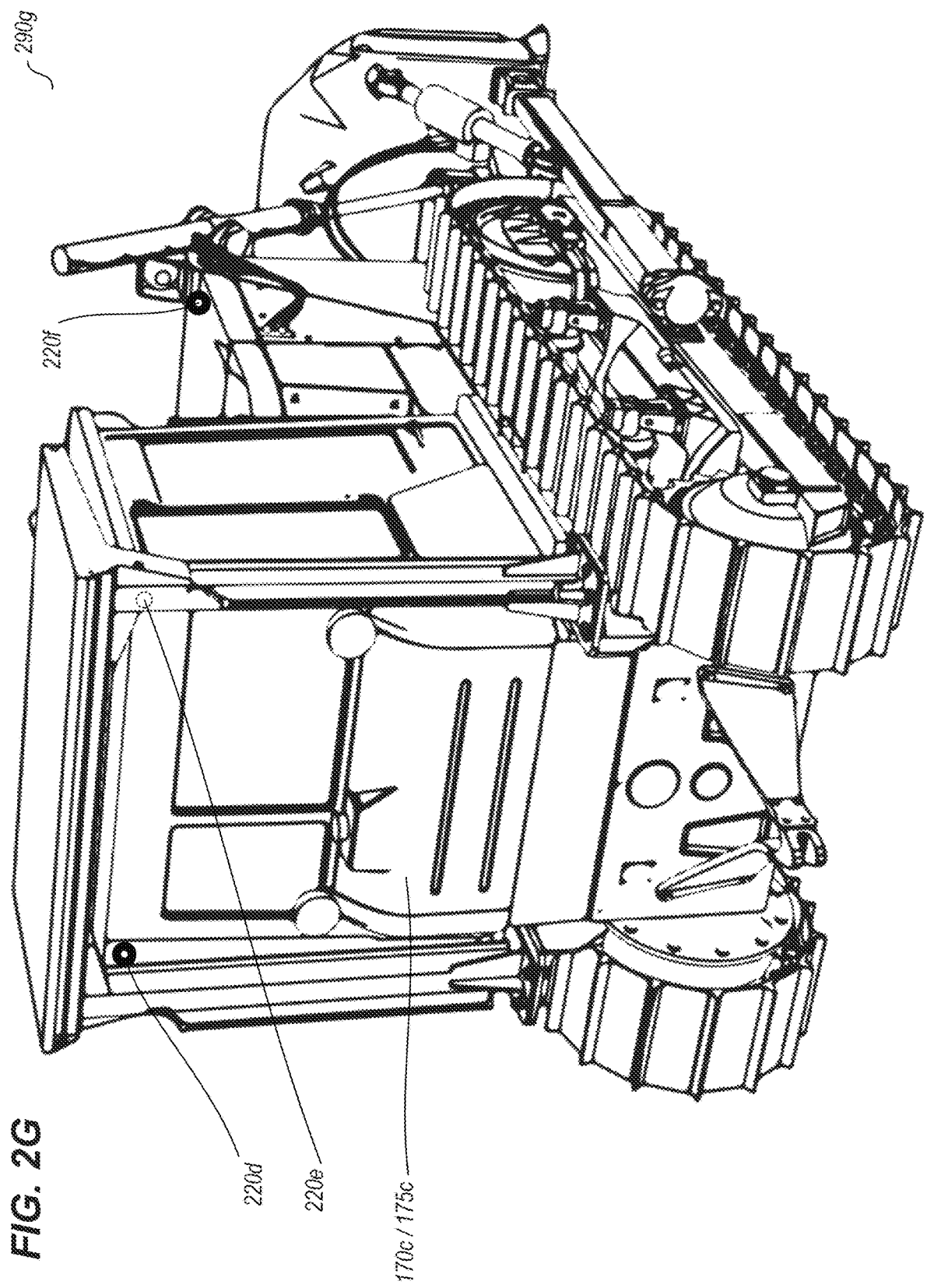

| | tilt_x | tilt_y | tilt_z | angles_x | angles_y | angles_z | bucket_x | bucket_y | bucket_z | ... |
|---|---|---|---|---|---|---|---|---|---|---|
| 275a | -0.00321 | -0.00058 | -3.13013 | 0.424944 | -2.68346 | -0.46965 | -1.891914 | 0.134353 | 1.126755 | |
| 275b | -0.00321 | -0.00058 | -3.13013 | 0.424944 | -2.68346 | -0.46965 | -1.891914 | 0.134353 | 1.126755 | |
| 275c | -0.00321 | -0.00058 | -3.13013 | 0.424944 | -2.68346 | -0.46965 | -1.891914 | 0.134353 | 1.126755 | |
| 275d | 0.003419 | -0.00546 | -3.12982 | 0.424878 | -2.68364 | -0.46975 | -1.890908 | 0.127374 | 1.12876 | |
| 275e | 0.003419 | -0.00546 | -3.12982 | 0.424878 | -2.68364 | -0.46975 | -1.890908 | 0.127374 | 1.12876 | |
| 275f | 0.003419 | -0.00546 | -3.12982 | 0.424878 | -2.68364 | -0.46975 | -1.890908 | 0.127374 | 1.12876 | |
| 275g | 0.004599 | 0.01593 | 2.844442 | 0.057934 | -1.19202 | -0.5644 | -6.58639 | -1.89195 | -2.1599 | |
| 275h | 0.004599 | 0.01593 | 2.844442 | 0.057934 | -1.19202 | -0.5644 | -6.58639 | -1.89195 | -2.1599 | |
| 275i | 0.004599 | 0.01593 | 2.844442 | 0.057934 | -1.19202 | -0.5644 | -6.58639 | -1.89195 | -2.1599 | |
| 275j | -0.00319 | 0.000547 | 2.516637 | 0.403479 | -1.136687 | -2.34415 | -4.78747 | -3.31185 | 1.906756 | |
| 275k | -0.00319 | 0.000547 | 2.516637 | 0.403479 | -1.136687 | -2.34415 | -4.78747 | -3.31185 | 1.906756 | |
| 275l | -0.00319 | 0.000547 | 2.516637 | 0.403479 | -1.136687 | -2.34415 | -4.78747 | -3.31185 | 1.906756 | |

| | target_vec | target_vec | target_vec | have_rack | on_goal | stick_end_xyz | stick_end_xyz | stick_end_xyz | ... |
|---|---|---|---|---|---|---|---|---|---|
| 275a | -4.46814 | -1.91098 | -1.22771 | 0 | 0 | -3.45634 | 0.154482 | 1.802344 | |
| 275b | -4.46814 | -1.91098 | -1.22771 | 0 | 0 | -3.45634 | 0.154482 | 1.802344 | |
| 275c | -4.46814 | -1.91098 | -1.22771 | 0 | 0 | -3.45634 | 0.154482 | 1.802344 | |
| 275d | -4.46878 | -1.908821 | -1.2247 | 0 | 0 | -3.45544 | 0.143446 | 1.804334 | |
| 275e | -4.46878 | -1.908821 | -1.2247 | 0 | 0 | -3.45544 | 0.143446 | 1.804334 | |
| 275f | -4.46878 | -1.908821 | -1.2247 | 0 | 0 | -3.45544 | 0.143446 | 1.804334 | |
| 275g | 6.631897 | -3.3433 | 4.615462 | 1 | 0 | -0.76583 | -1.95503 | -0.46638 | |
| 275h | 6.631897 | -3.3433 | 4.615462 | 1 | 0 | -0.76583 | -1.95503 | -0.46638 | |
| 275i | 6.631897 | -3.3433 | 4.615462 | 1 | 0 | -0.76583 | -1.95503 | -0.46638 | |
| 275j | 4.837532 | -1.929982 | 0.57547 | 1 | 1 | -6.16686 | -4.30654 | 2.016771 | |
| 275k | 4.837532 | -1.929982 | 0.57547 | 1 | 1 | -6.16686 | -4.30654 | 2.016771 | |
| 275l | 4.837532 | -1.929982 | 0.57547 | 1 | 1 | -6.16686 | -4.30654 | 2.016771 | |

*FIG. 2K*

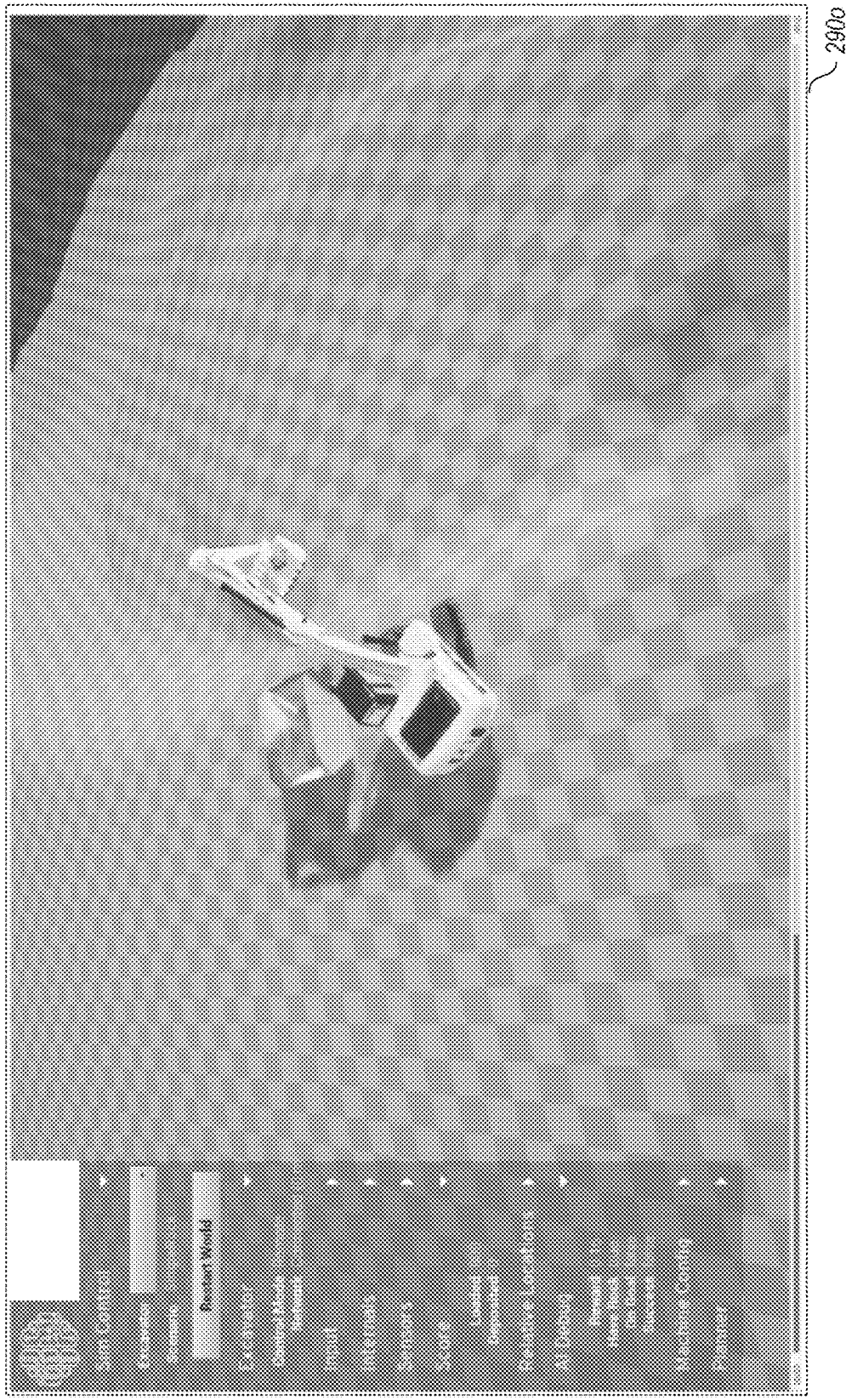
FIG. 2-O

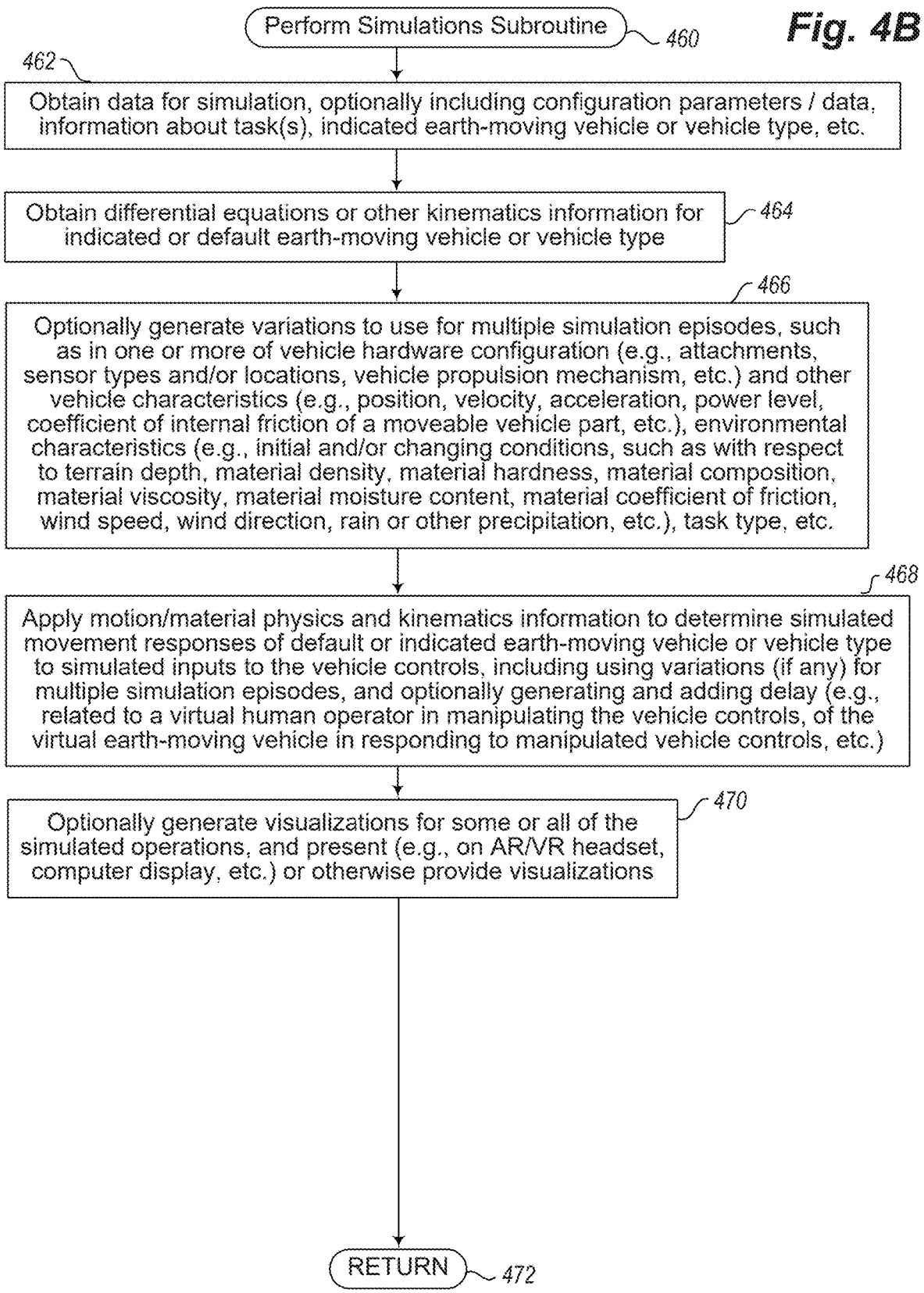

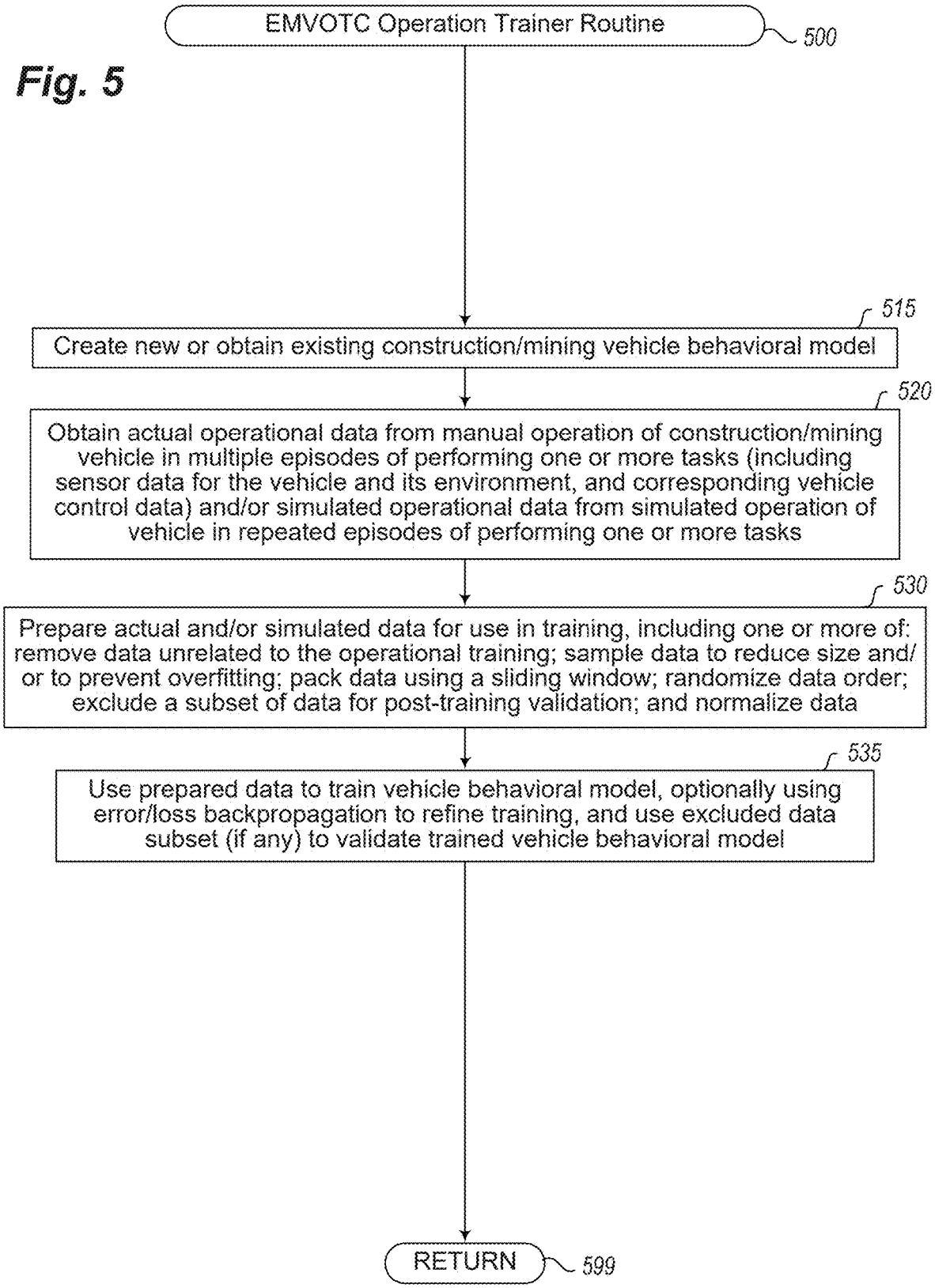

AUTONOMOUS CONTROL OF OPERATIONS OF EARTH-MOVING VEHICLES USING DATA FROM SIMULATED VEHICLE OPERATION

CROSS REFERENCE TO RELATED APPLICATIONS

This application claims the benefit of U.S. Provisional Patent Application No. 63/350,149, filed Jun. 8, 2022 and entitled "Autonomous Control Of Operations Of Earth-Moving Vehicles Using Data From Simulated Vehicle Operation," which is hereby incorporated by reference in its entirety.

TECHNICAL FIELD

The following disclosure relates generally to systems and techniques for autonomous control of operations of earth-moving vehicles, such as to determine and implement autonomous operations of one or more construction and/or mining vehicles on a site that include determining and controlling movement of their arms and/or attachments to move materials or perform other actions and that are based at least in part on data from simulated operation of the vehicle(s).

BACKGROUND

Earth-moving construction vehicles may be used on a job site to move soil and other materials (e.g., gravel, rocks, asphalt, etc.) and to perform other operations, and are each typically operated by a human operator (e.g., a human user present inside a cabin of the construction vehicle, a human user at a location separate from the construction vehicle but performing interactive remote control of the construction vehicle, etc.). Similarly, earth-moving mining vehicles may be used to extract or otherwise move soil and other materials (e.g., gravel, rocks, asphalt, etc.) and to perform other operations, and are each typically operated by a human operator (e.g., a human user present inside a cabin of the mining vehicle, a human user at a location separate from the mining vehicle but performing interactive remote control of the mining vehicle, etc.).

Limited autonomous operations (e.g., performed under automated programmatic control without human user interaction or intervention) of some construction and mining vehicles have occasionally been used, but existing techniques suffer from a number of problems, including the use of limited types of sensed data, an inability to perform fully autonomous operations when faced with on-site obstacles, an inability to coordinate autonomous operations between multiple on-site construction and/or mining vehicles, requirements for bulky and expensive hardware systems to support the limited autonomous operations, etc.

BRIEF DESCRIPTION OF THE DRAWINGS

FIGS. 2A-2I illustrate examples of earth-moving construction and/or mining vehicles and types of on-vehicle data sensors positioned to support autonomous operations on a site.

FIGS. 2K-2Q illustrate examples of performing simulations of operations of an earth-moving construction and/or mining vehicle on a site.

FIGS. 4A-4B are an example flow diagram of an illustrated embodiment of a EMVOTC Operational Data Simulator Module routine.

FIG. 5 is an example flow diagram of an illustrated embodiment of a EMVOTC Operation Trainer Module routine.

DETAILED DESCRIPTION

Figure 1A:
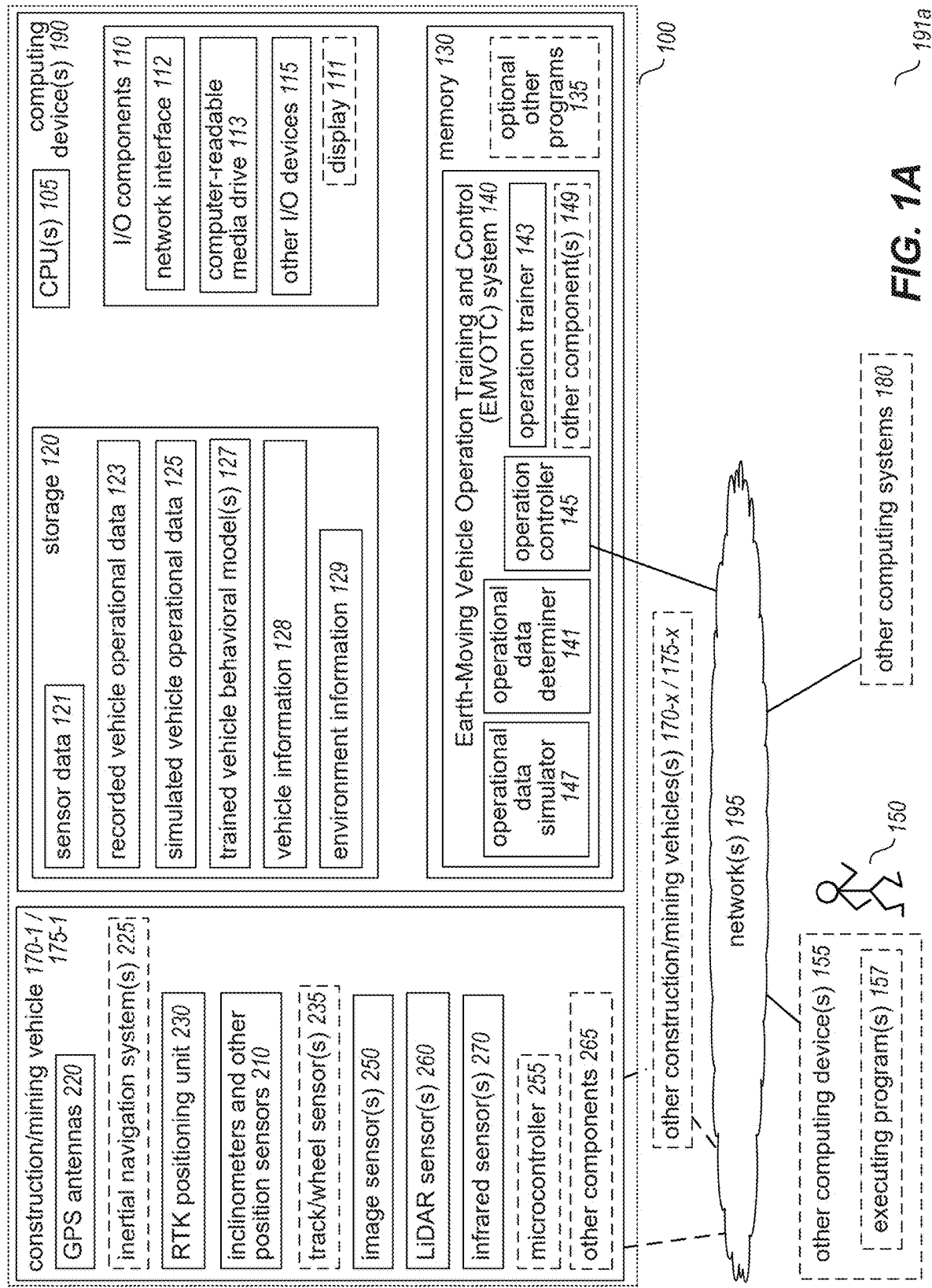
FIG. 1A is a network diagram illustrating an example embodiment of using described systems and techniques to determine and implement autonomous operations of one or more earth-moving construction and/or mining vehicles on a site based at least in part on using data from simulated operations of the vehicle(s).

Systems and techniques are described for implementing autonomous control of operations of earth-moving vehicles, such as to automatically determine and control autonomous movement of part or all of one or more earth-moving construction and/or mining vehicles (e.g., a vehicle's hydraulic arm(s) and/or attachment(s), such as a digging bucket, claw, hammer, blade, etc.) to move materials or perform other actions in a manner that is based at least in part on data from simulated operation of the vehicle(s). In at least some embodiments, the described systems and techniques are used to determine and implement fully autonomous operations of one or more earth-moving construction and/or mining vehicles in accordance with one or more defined tasks (e.g., dig a hole of a specified size and/or shape and/or at a specified location, move one or more rocks from a specified area, extract a specified amount of one or more materials, remove hazardous or toxic material from above ground and/or underground, etc.) and/or other goals, including in at least some embodiments and situations to do so when faced with possible on-site obstacles (e.g., man-made structures, rocks and other naturally occurring impediments, other equipment, people or animals, etc.) and/or to implement coordinated actions of multiple such construction and/or mining vehicles of one or more types—as part of doing so, data from simulated operation of the earth-moving vehicle(s) may be used in various manners, such as for use in training one or more machine learning models that are used in implementing the autonomous operations, determining optimal or otherwise preferred hardware component configurations to use, determining optimal or otherwise preferred implementation plans to use for one or more tasks and/or multi-task jobs, enabling what-if exploratory determination activities, etc. Additional details related to implementing autonomous control of earth-moving vehicles in particular manners are described below, and some or all of the described techniques are performed in at least some embodiments by automated operations of an Earth-Moving Vehicle Operation Training and Control ("EMVOTC") system to control one or more earth-moving vehicles of one or more types (e.g., an EMVOTC system operating on at least one of one or more earth-moving vehicles being controlled).

In at least some embodiments, data from simulated operations of one or more earth-moving vehicles (referred to at times herein as 'simulated operational data') may be generated and used in various manners, such as by modeling kinematics information for vehicle movement and physics related to the vehicle movements and interactions with its surrounding environment (e.g., terrain in which to dig or to move). Such simulated operations may include, for example, simulating performance of one or more tasks by one or more particular earth-moving vehicles or types of earth-moving vehicles, such as by performing multiple simulated episodes of performing each such task using variations in one or more of vehicle characteristics and/or environmental characteristics and/or in the task(s) to be performed, such as to vary starting conditions (e.g., obstacles, tool/attachment position, etc.) and/or changing conditions (e.g., weather) and/or vehicle control manipulations, and with each episode having data about simulated manipulations of the earth-moving vehicle's controls and resulting vehicle responses to perform an instance of the task (e.g., for hundreds or thousands or millions of episodes with varied conditions and actions, including to introduce a variety of realistic variations and to allow experimentation that exceeds what is practically available from only actual operational data). Particular vehicle characteristics for the earth-moving vehicle to use for one or more simulation episodes may be specified, such as for initial and/or changing conditions, and with non-exclusive examples including vehicle hardware configuration (e.g., attachments, sensor types and/or locations, vehicle propulsion mechanism, etc.) and other vehicle characteristics (e.g., position, velocity, acceleration, power level, coefficient of internal friction of a moveable vehicle part, etc.). In addition, particular environmental characteristics to use for some or all of an environment under and/or around the earth-moving vehicle to use for one or more simulation episodes may be specified, such as for initial and/or changing conditions, and with non-exclusive examples including terrain depth, material density, material hardness, material composition, material viscosity, material moisture content, material coefficient of friction, wind speed, wind direction, rain or other precipitation, etc. FIGS. 2J-2Q and elsewhere herein provide additional details about non-exclusive examples of performing such simulations. It will be appreciated that the generating of such simulated operational data for one or more earth-moving vehicles may be performed in other manners in other embodiments.

Such simulated operational data may further be used in one or more manners in various embodiments, including in some embodiments for training one or more machine learning models to later be used in implementing the autonomous operations-FIG. 2J and elsewhere herein provide additional details about non-exclusive examples of performing such training activities based at least in part on simulated operational data. In addition, in some embodiments, such simulated vehicle operations and resulting simulated operational data may be used in other manners, whether in addition to or instead of such machine learning model training, including one or more of the following: determining optimal or otherwise preferred hardware component configurations, such as by simulating the use of different hardware components (e.g., different sensor types) and/or component placement locations and/or combinations of sensor types/placements, and evaluating the performance of the vehicle in performing one or more tasks with those hardware component configurations with respect to one or more metrics (e.g., time to completion, cost, success rates, error rates, etc.), such as to initiate subsequent use of corresponding highly ranked or rated hardware component configurations on actual physical vehicles (e.g., for one or more top-ranked or top-rated hardware component configurations); determining optimal or otherwise preferred implementation plans for one or more tasks and/or multi-task jobs, such as by simulating the performance of such a task or job in different alternative implementations (e.g., using different orders and/or types of operations, using different quantities and/or types of earth-moving vehicles, using different hardware component configurations, etc.), and evaluating the performance of the task or job for those alternative implementations with respect to one or more metrics (e.g., time to completion, cost, success rates, error rates, etc.), such as to initiate subsequent actual performance of the task or job by one or more corresponding actual physical vehicles (e.g., using the implementation(s) corresponding to one or more top-ranked or top-rated alternatives); enabling user what-if experimentation activities, such as by simulating the performance of one or more tasks or jobs or other operations/activities using user-specified alternatives (e.g., different vehicles, different vehicle types, different hardware component configurations, different environmental conditions or other starting conditions, etc.), and evaluating the performance for those alternatives with respect to one or more metrics (e.g., time to completion, cost, success rates, error rates, etc.), such as to assist the user with planning purposes; etc. It will be appreciated that the data from simulated operations of one or more earth-moving vehicles may be used in various other manners in other embodiments.

The described techniques provide various benefits in various embodiments, including to improve the control of autonomous operations of earth-moving vehicles (e.g., fully autonomous operations), such as based at least in part on simulating data for operating one or more such earth-moving vehicles (e.g., one or more earth-moving vehicle types) and on using the data from simulated operations in one or more beneficial manners (e.g., as part of training one or more machine learning behavior model(s) to control corresponding autonomous operations of one or more corresponding earth-moving vehicles, such as to perform the training faster, using less hardware resources, and to provide more robust and accurate trained models due to the greater variability provided by the simulated operational data). In at least some such embodiments, the simulating is further performed for various hardware alternatives (e.g., for different sensor types or other hardware components, different component placement locations, different configurations of multiple types of sensors and/or other hardware components, etc.) and/or various environmental conditions without needing to physically implement such hardware alternatives or environmental conditions, such as to evaluate the alternatives (e.g., to determine optimal or near-optimal hardware components and/or placements, so as to greatly reduce the built cycle time by not using interactions with corresponding physical earth-moving vehicles to obtain desired operational data), as well as to provide other benefits. Furthermore, such automated techniques allow such simulated operational data and resulting automatically determined effects to be determined more quickly and with greater accuracy than previously existing techniques, including to significantly reduce computing power and time used. In addition, in some embodiments the described techniques may be used to provide an improved GUI in which a user may more accurately and quickly obtain information about operations of earth-moving vehicles and optionally provide corresponding input (e.g., to enable user-driven operations for a user to posit and evaluate job performance scenarios and plan job execution), such as in response to search requests or other instructions, as part of providing personalized information to the user, etc.

Various other benefits are also provided by the described techniques, some of which are further described elsewhere herein.

As is also noted above, automated operations of an EMVOTC system may include determining current location and other positioning of an earth-moving vehicle on a site in at least some embodiments. As one non-exclusive example, such position determination may include using one or more track and/or wheel sensors to monitor whether or not the earth-moving vehicle's tracks and/or wheels are aligned in the same direction as the cabin (e.g., for excavators and other types of earth-moving vehicles in which the cabin can rotate or otherwise move relative to the vehicle's tracks and/or wheels), and using GPS data (e.g., from 3 GPS antennas located on an earth-moving vehicle cabin, such as in a manner similar to that described with respect to FIGS. 2B and 2C) and optionally in conjunction with an inertial navigation system to determine the rotation of the cabin chassis (e.g., relative to true north), as well as to determine an absolute location of the vehicle's body and/or other parts. When using data from multiple GPS antennas, the data may be integrated in various manners, such as using a microcontroller located on the earth-moving vehicle (e.g., using the 'Sparkfun' GPS Arduino % library from u-blox for the GPS receiver), and with additional RTK (real-time kinematic) positioning data used to provide an RTK-enabled GPS positioning unit that reinforces and provides further precision with respect to the GPS-based location (e.g., to achieve 1-inch precision or better). In some embodiments and situations, LiDAR data is used to assist in position determination operations, such as by surveying the surroundings of the earth-moving vehicle (e.g., an entire job site on which the earth-moving vehicle is located) and confirming a current location of the earth-moving vehicle (e.g., relative to a three-dimensional, or 3D, map of the job site generated from the LiDAR data). Additional details are included below regarding such automated operations to determine current location and other positioning of an earth-moving vehicle on a site.

In at least some embodiments, data may be obtained and used by the EMVOTC system from sensors of multiple types positioned on or near one or more earth-moving construction and/or mining vehicles, such as one or more of GPS location data, track and cabin heading data, visual data of captured image(s), depth data from LiDAR and/or other depth-sensing and proximity devices, infrared data, real-time kinematic positioning information based on GPS data and/or other positioning data, inclinometer data for particular moveable parts of an earth-moving vehicle (e.g., the digging arm/attachment of an earth-moving vehicle), etc. As one non-exclusive example, the described systems and techniques may in some embodiments include obtaining and integrating data from sensors of multiple types positioned on an earth-moving construction and/or mining vehicle at a site, and using the data to determine and control operations of the vehicle to accomplish one or more defined tasks at the site, including determining current location and positioning of the vehicle on the site, identifying and classifying obstacles (if any) involved in accomplishing the task(s), and determining and implementing actions to control movement of some or all of the vehicle to move materials or perform other actions for the one or more tasks (including to address any such obstacles as part of doing so). Such earth-moving construction vehicles (e.g., one or more tracked or wheeled excavators, bulldozers, tracked or wheeled skid loaders or other loaders such as front loaders and backhoe loaders, graders, cranes, compactors, conveyors, dump trucks or other trucks, deep sea construction machinery, extra-terrestrial construction machinery, etc.) and earth-moving mining vehicles (e.g., one or more tracked or wheeled excavators, bulldozers, tracked or wheeled skid loaders and other loaders such as front loaders and backhoe loaders, scrapers, graders, cranes, trenchers, dump trucks or other trucks, deep sea mining machinery, extra-terrestrial mining machinery, etc.) are referred to generally as 'earth-moving vehicles' herein, and while some illustrative examples are discussed below with respect to controlling one or more particular types of vehicles (e.g., excavator vehicles, wheel loaders or other loader vehicles, dump truck or other truck vehicles, etc.), it will be appreciated that the same or similar techniques may be used to control one or more other types of construction and/or mining vehicles. With respect to sensor types, one or more types of GPS antennas and associated components may be used to determine and provide GPS data in at least some embodiments, with one non-exclusive example being a Taoglas MagmaX2 AA.175 GPS antenna. In addition, one or more types of LiDAR devices may be used in at least some embodiments to determine and provide depth data about an environment around an earth-moving vehicle (e.g., to determine a 3D, or three-dimensional, model of some or all of a job site on which the vehicle is situated), with non-exclusive examples including LIDAR sensors of one or more types from Livox Tech. (e.g., Mid-70, Avia, Horizon, Tele-15, Mid-40, HAP, etc.) and with corresponding data optionally stored using Livox's LVX point cloud file format v1.1-in some embodiments, other types of depth-sensing and/or 3D modeling techniques may be used, whether in addition to or instead of LiDAR, such as using other laser rangefinding techniques, synthetic aperture radar or other types of radar, sonar, image-based analyses (e.g., SLAM, SfM, etc.), structured light, etc. Furthermore, one or more proximity sensor devices may be used to determine and provide short-distance proximity data in at least some embodiments, with one non-exclusive example being an LJ12A3-4-Z/BX inductive proximity sensor from ETT Co., Ltd. Moreover, real-time kinematic positioning information may be determined from a combination of GPS data and other positioning data, with one non-exclusive example including use of a u-blox ZED-F9P multi-band GNSS (global navigation satellite system) RTK positioning component that receives and uses GPS, GLONASS, Galileo and BeiDou data, such as in combination with an inertial navigation system (with one non-exclusive example including use of MINS300 by BW Sensing) and/or a radio that receives RTK correction data (e.g., a Digi XBee SX 868 RF module). Other hardware components that may be positioned on or near an earth-moving vehicle and used to provide data and/or functionality used by the EMVOTC system include the following: one or more inclinometers (e.g., single axis and/or double axis) or other accelerometers (with one non-exclusive example including use of an inclination sensor by DIS sensors, such as the QG76 series); a CAN bus message transceiver (e.g., a TCAN 334 transceiver with CAN flexible data rate); one or more low-power microcontrollers (e.g., an i.MX RT1060 Arm-based Crossover MCU microprocessor from NXP Semiconductors, a PJRC Teensy 4.1 Development Board, a Grove 12-bit Magnetic Rotary Position Sensor AS5600, etc.), such as to execute and use executable software instructions and associated data of the EMVOTC system; one or more voltage converters and/or regulators (e.g., an ST LD1117 adjustable and fixed low drop positive voltage regulator, an ST LM217 or LM317 adjustable voltage regulator, etc.); a voltage level shifter (e.g., a Fairchild Semiconductor BSS138 N-Channel Logic Level Enhancement Mode Field Effect Transistor); etc. In addition, in at least some embodiments and situations, one or more types of data from one or more sensors positioned on an earth-moving vehicle may be combined with one or more types of data (whether the same types of data and/or other types of data) acquired from one or more positions remote from the earth-moving vehicle (e.g., from an overhead location, such as from a drone aircraft, an airplane, a satellite, etc.; elsewhere on a site on which the earth-moving vehicle is located, such as at a fixed location and/or on another earth-moving vehicle of the same or different type; etc.), with the combination of data used in one or more types of autonomous operations as discussed herein. Additional details are included below regarding positioning of data sensors and use of corresponding data, including with respect to the examples of FIGS. 2A-2I and 2K.

Automated operations of an EMVOTC system may further in at least some embodiments include identifying and classifying obstacles (if any) involved in accomplishing one or more tasks, including in some embodiments and situations as part of moving an earth-moving vehicle along a desired route or otherwise between current and destination locations. For example, LiDAR data (or other depth-sensing data) and/or visual data, whether data from an environment above and/or below ground, may be analyzed to identify objects that are possible obstacles and as part of classifying a type of each obstacle, and other types of data (e.g., infrared) may be further used as part of classifying an obstacle type, such as to determine whether an obstacle is a human or animal (e.g., based at least in part by having a temperature above at least one first temperature threshold, whether an absolute temperature threshold or a temperature threshold relative to a temperature of a surrounding environment), whether an obstacle is a running vehicle (e.g., based at least in part by having a temperature above at least one second temperature threshold, such as a second temperature threshold higher than the first temperature threshold, and whether an absolute temperature threshold or a temperature threshold relative to a temperature of a surrounding environment), etc., and in some embodiments and situations by using one or more trained machine learning models (e.g., using a point cloud analysis routine for object classification) or via other types of analysis (e.g., image analysis techniques). As one non-exclusive example, each obstacle may be classified on a scale from 1 (easy to remove) to 10 (not passable), including to consider factors such as whether an obstacle is a human or other animal, is another vehicle that can be moved (e.g., using coordinated autonomous operation of the other vehicle), is infrastructure (e.g., cables, plumbing, etc.), based on obstacle size (e.g., using one or more size thresholds) and/or obstacle material (e.g., is water, oil, soil, rock, etc.) and/or other obstacle attribute (e.g., number of attempts of removal from different digging angles), etc. If movement between locations is included as part of accomplishing a task, such classifying of obstacles may further be used as part of determining a route between a current location and a target destination location, such as to determine an alternative route to use if one or more obstacles of a sufficiently high classified type (e.g., of class 7 or higher) are present along what would otherwise be the initially determined route (e.g., a direct linear path). For example, depending on information about an obstacle (e.g., a type, distance, shape, depth, etc.), the automated operations of the EMVOTC system may determine to, as part of the autonomous operations of a first earth-moving vehicle, perform at least one of the following: (1) remove the obstacle and move in a direct path to the target destination location (e.g., if the first earth-moving vehicle has capabilities to effectuate such obstacle removal), or (2) move in an optimized path around the obstacle to the target destination location, or (3) initiate autonomous operations of a separate second earth-moving vehicle to remove the obstacle (e.g., if the first earth-moving vehicle does not have capabilities to effectuate such obstacle removal), and to then move the first earth-moving vehicle in a direct path to the target destination location, or (4) inhibit movement of the first earth-moving vehicle (e.g., to stop movement until the obstacle is gone, such as for a human or animal obstacle), or (5) initiate autonomous operations of a separate third earth-moving vehicle (e.g., of the same type as the first earth-moving vehicle) to move to the target destination location in preparation of performing a task in place of the first earth-moving vehicle, or (6) initiate a request for human intervention.

In addition, automated operations of an EMVOTC system may further include determining and implementing actions to control movement of some or all of an earth-moving vehicle (e.g., the earth-moving vehicle's arm(s) and/or attachment(s) and/or body/chassis) to move materials or perform other actions for one or more tasks on a job site or other geographical area, including to address any identified obstacles as part of doing so. For example, in some embodiments the EMVOTC system may include one or more planner modules, and at least one such planner module may be used to determine an optimal plan to complete a job having one or more tasks to be performed (e.g., in accordance with other goals or planning operations being performed by the EMVOTC system or a related system, such as based on an overall analysis of a site and/or as part of accomplishing a group of multiple activities at the site). In addition, the autonomous operations of the earth-moving vehicle to perform one or more tasks may be initiated in various manners, such as by an operator module of the EMVOTC system that acts in coordination with the one or more planner modules (e.g., based on a planner module providing instructions to the operator module about current work to be performed, such as work for a current day that involves the earth-moving vehicle moving designated dirt or other materials, leaving a diggable area and moving to a new area to dig, etc.), or directly by a planner module. In other embodiments, determination of one or more target tasks to perform and initiation of corresponding earth-moving vehicle activities may be performed in other manners, such as in part or in whole based on input received from one or more human users or other sources.

In at least some embodiments, the EMVOTC system may include one or more behavioral models used to determine the specific movements and/or other actions of some or all of an earth-moving vehicle of a given type to accomplish a task (e.g., multiple behavioral models each associated with a type of task and/or type of earth-moving vehicle and/or a particular earth-moving vehicle), and automated operations of the EMVOTC system may include training the behavioral models(s) using data from operations of the earth-moving vehicle or of earth-moving vehicles of the given type (e.g., actual operational data and/or simulated operational data) and later using the trained behavioral model(s) to determine how to implement a particular task in a particular set of circumstances (e.g., starting conditions). In addition, a behavioral model may have various forms in various embodiments, including in some embodiments to be implemented as a multi-layer actor model and/or to use a multi-layer neural network, such as a neural network having some or all of the following layers: an input sequential layer with one or more nodes that receive packed input data that represents some or all of one or more episodes of actual and/or simulated operational data (e.g., packed input data for one or more sliding windows, representing states of initial conditions for the earth-moving vehicle and surrounding environment) and that extract packed data (e.g., to capture underlying time structures), with outputs being generated logits (e.g., unnormalized outputs or predictions); one or more first hidden neural network layers with one or more nodes to represent the state inputs and that receive the logits of the sequential neural network layer as inputs and that generate additional logits as outputs; a concatenation layer with one or more nodes that receive and merge the hidden layer logits with the sequential layer logits and outputs merged logits; one or more second hidden neural network layers with multiple nodes that receive and further process the output logits of the concatenation layer and generate a combination of states and logits as outputs; an output layer with multiple nodes to convert outputs of the second hidden layer(s) to actions (e.g., activation functions) to be performed by the earth-moving vehicle; etc. In some embodiments, each behavioral model may be trained (e.g., using behavioral cloning techniques) to implement a task using a combination of actual data from actual human operation of an earth-moving vehicle to perform the task (e.g., multiple episodes each having data about the manipulation of the manual controls of the earth-moving vehicle to perform an instance of the task) and simulated data of operating an earth-moving vehicle to perform the task (e.g., multiple simulated episodes using variations in starting conditions and/or control manipulations and each having data about manipulations of the earth-moving vehicle's controls to perform an instance of the task), such as by using positive and/or negative training examples. It will be appreciated that other behavioral model structures and/or training activities may be performed in other embodiments and situations. In at least some embodiments, the use of a combination of actual and simulated operational data (e.g., very large scale simulated data, such as for hundreds or thousands or millions of episodes with varied conditions and actions, including to introduce a variety of realistic variations and to allow experimentation that exceeds that practically available from only actual data) and trained behavioral model(s) in the manners described herein allows the EMVOTC system to use the trained behavioral model(s) to perform autonomous control of the operations of one or more corresponding earth-moving vehicles in a manner that exceeds human operator capabilities, such as to operate with greater-than-human speed and/or precision and/or accuracy and/or safety. In addition, in at least some such embodiments, a transfer learning solution is used that bootstraps a behavioral model trained using simulated operational data to perform autonomous control of an actual earth-moving vehicle (e.g., to improve that trained behavioral model over time using further data obtained from the actual autonomously controlled operation of the vehicle). In addition, canonical optimal movements may be learned from the simulated and/or actual operational data, using machine learning to parametrize and adapt the data to a wide range of situations and scenarios—as one non-exclusive example, a loading trajectory on flat ground can be automatically adapted to loading on any terrain slope, for different machine types and sizes, for different brands of earth moving and mining machinery, etc.

As one non-exclusive example related to training a behavioral model for a particular type of construction vehicle (or particular construction vehicle, such as a particular excavator vehicle) to perform a particular task (e.g., extract a specified quantity of material from a designated area and move it to a target destination, extract a rock or other obstacle and move it out of a designed area, etc.), automated operations of the EOTC system may include some or all of the following: gathering actual data from actual operation by one or more humans of one or more corresponding construction vehicles to perform the task (e.g., for a specified period of time, such as a specified number of minutes or hours or days; for a specified quantity of episodes of performing the task; etc.); generating simulated data of operating one or more corresponding construction vehicles to perform the task (e.g., for a specified quantity of episodes of performing the task; for a specified period of time; etc., including in at least some embodiments and situations to simulate initial conditions for an episode that include simulated data for some or all of the types of sensors and corresponding sensed data that are available); sampling the actual and/or simulated data one or more times, such as to reduce the amount of data; identifying and removing subsets of the actual and/or simulated data that do not correspond to relevant activities for the task (e.g., idle actions in which active control of the construction vehicle does not occur, or in which active control of the construction vehicle is for activities that are not directly part of performing the task); packing the remaining actual and/or simulated data (e.g., after sampling and removing non-relevant activity data) via a sliding window technique, such as to repeatedly select and concatenate time-based subsets (in an amount based on the size of the sliding window); randomizing the order of the remaining actual and/or simulated data (e.g., after packing), such as by shuffling data corresponding to different episodes into a random order (e.g., to prevent training bias); removing and saving a validation data subset of the remaining actual and/or simulated data (e.g., after the randomizing) for use in validating the trained model after the training; normalizing the remaining actual and/or simulated data, such as to use consistent measurements and scales; for each episode in the remaining actual and/or simulated data, determining a first subset of the data corresponding to input to the behavior model and a second subset of the data corresponding to expected output from the behavioral model, supplying the input data subset for the episode to the behavioral model, identifying differences between the corresponding output from the behavioral model and the expected output data for the output, and using the differences to train the behavioral model (e.g., to perform error or loss backpropagation to adjust internal weights or other attributes of the behavioral model) to learn improved performance, such as to measure error or loss based on some or all of mean squared distance between one or more vectors (e.g., between expected and actual vectors for movement of one or more of the excavator boom arm, stick arm, bucket, cabin, etc.), size of one or more of the vectors, one or more non-movement states of at least one excavator or other construction vehicle to be controlled, etc., such as to square and add the differences for each of the vector(s) and then take the square root of that sum; after some or all of the training is performed, using the validation data subset to measure accuracy of performance of the trained behavioral model (e.g., supplying an input data subset of the validation data to the trained behavioral model, and determining if the actual output of the trained behavioral model matches expected output data of the validation data, such as within a defined difference threshold) and optionally performing further training of the behavioral model if the training is not complete (e.g., if the performance is below a defined performance threshold, such as a specified accuracy percentage); etc. In addition, while in some embodiments and situations a behavioral model may be first trained and then subsequently used, in other embodiments and situations the training may be repeated (e.g., ongoing) after one or more uses (e.g., to improve performance, adapt to changing circumstances, etc.) and/or some or all of the training may occur as part of such of the behavioral model to control autonomous operations of one or more earth-moving vehicles (e.g., by using feedback from the controlled operations, such as via reinforcement learning, to improve the performance of the behavioral model during its ongoing use in controlling autonomous operations). Furthermore, in some embodiments and situations, a single behavioral model may be trained and used to control autonomous operations of multiple construction vehicles (e.g., multiple excavator vehicles, an excavator construction vehicle and one or more other non-excavator construction vehicles, etc.) to perform a task, while in other embodiments and situations the performance of such a task may include using a separate trained behavioral model for each type of construction vehicle (or particular construction vehicle) and coordinating the actions of the multiple construction vehicles via other automated operations of the EOTC system. Additional details are included below regarding such automated operations to train a behavioral model for an earth-moving vehicle to perform a particular type of task and to use the trained behavioral model to implement one or more instances of that task type, including with respect to the examples of FIGS. 2J-2Q.

Thus, in one non-exclusive embodiment, systems and techniques may be provided that are used for implementing autonomous control of operations of earth-moving vehicles based at least in part on data from simulated operation of the vehicle. One non-exclusive example of such systems and techniques includes a machine learning simulator system for construction planning, comprising one or more hardware processors; an operator input device of an earth-moving construction and/or mining vehicle of an indicated type, to capture an action-space involving human actuation of the operator input device that includes computing forces and counter-forces based on a set of differential equations modeling position, depth, material hardness, velocity, acceleration, friction, moisture content, material composition, density, and viscosity; a network command interface to receive input from an artificial intelligence engine and/or real-time simulator commands; a plurality of earth-moving vehicle behavioral models that are generated based on real-world modeling of operations of one or more types of earth-moving construction and/or mining vehicles that include the indicated type, wherein each earth-moving vehicle behavioral model includes information about operations of a cabin, a chassis, one or more arms and an attachment; a logging mechanism to provide a set of data for tracking the movement of one or more earth-moving construction and/or mining vehicles of the indicated type that include data about weight, position, angle, and sensor input; a network stack having a protocol buffer for inputting and outputting state data (e.g., a TCP/IP protocol stack, a UDP/IP protocol stack, a protocol stack using both TCP and UDP, etc.); and a dynamic noise generator having software instructions that, when executed by the one or more hardware processors, generate strategic delay noise added to represent at least one of delay of a human operator while using the operator input device, or delay of input from the artificial intelligence engine, or delay corresponding to hydraulic resistance of earth-moving construction and/or mining vehicles of the indicated type. Such a system may, for example, further include an Internet-accessible module for performing maintenance of the simulator system, such as for one or more of internal modeling (e.g., forcibly changing the behavior of the ML), code updates, precision versus speed control, etc. Such a system may, for example, further include a virtual reality (VR) system including VR glasses and a VR engine to receive and present data generated by the simulator system (e.g., for virtually placing a user next to an earth-moving vehicle to observe its movements, to monitor sensor data and replays, etc.), optionally separate from a customer-facing application (e.g., to execute on a tablet and/or other computing device). Such a system may, for example, further include a planner interface for receiving instructions from a planner module to actuate operations in the simulator of one or more earth-moving construction and/or mining vehicles of the indicated type. Such a system may, for example, further include a customer-facing application allowing replays of plans and sensor data. Such a system may, for example, further include having each of the plurality of earth-moving vehicle behavioral models correspond to a distinct actual earth-moving construction and/or mining vehicle of the indicated type. Such a system may, for example, further include having the indicated type of earth-moving construction and/or mining vehicle be at least one of type of excavator vehicle, or a type of bulldozer, or a type of truck, or a type of loader vehicle. Such a system may, for example, further include having the attachment be at least one of a claw or a bucket. Such a system may, for example, further include having the input from the artificial intelligence engine include automated actuation of the operator input device of the earth-moving construction and/or mining vehicle of the indicated type. Such a system may, for example, further include having the set of data from the logging mechanism be provided to the artificial engine for use in training at least one of the earth-moving vehicle behavioral models using behavioral modeling techniques. Another non-exclusive example of such systems and techniques includes a computer-implemented method comprising generating, by one or more computing systems, data about simulated operations of an earth-moving construction and/or mining vehicle of an indicated type to implement a plurality of episodes each involving simulated performance of a specified task, wherein the plurality of episodes involve variations in at least one of environmental conditions in which the vehicle operates, or hardware component configurations of the vehicle, or starting conditions of the vehicle, or in attributes of the specified task, and wherein the simulated operations of the vehicle for the performance of the specified task for each of the plurality of episodes includes movements of at least one of an arm or an attachment or a cabin or a chassis of the vehicle in response to inputs to one or more input control devices of the vehicle; and providing, by the one or more computing systems, the generated data about the simulated operations, to cause further activities involving one or more actual earth-moving construction and/or mining vehicles of the indicated type. Such a method may, for example, further include having the providing of the generated data about the simulated operations include using the generated data about the simulated operations to perform training of one or more earth-moving vehicle behavioral models that represent operations of the indicated type of earth-moving construction and/or mining vehicles or of a particular earth-moving construction and/or mining vehicle of the indicated type, wherein each earth-moving vehicle behavioral model includes information about operations of at least one of a cabin, a chassis, one or more arms or an attachment. Such a method may, for example, further include obtaining actual data from actual operations of one or more earth-moving vehicles of the indicated type by one or more human operator users, and wherein the training further includes using the actual data in combination with the generated data about the simulated operations. Such a method may, for example, further include receiving input about multiple alternative hardware component configurations of the earth-moving construction and/or mining vehicle of the indicated type, wherein the generating of the data about the simulated operations includes evaluating the multiple alternative hardware component configurations while having the earth-moving construction and/or mining vehicle of the indicated type complete the simulated performance of the specified task, and wherein the providing of the generated data about the simulated operations includes providing evaluation information from the evaluating to cause implementation of at least one of the alternative hardware component configurations on an actual earth-moving construction and/or mining vehicle of the indicated type. Such a method may, for example, further include receiving input about multiple alternative implementations, by the earth-moving construction and/or mining vehicle of the indicated type, of multiple tasks that include the specified task, wherein the generating of the data about the simulated operations includes evaluating the multiple alternative implementations by having the earth-moving construction and/or mining vehicle of the indicated type complete the simulated performance of the multiple tasks, and wherein the providing of the generated data about the simulated operations includes providing evaluation information from the evaluating to use at least one of the alternative implementations on an actual earth-moving construction and/or mining vehicle of the indicated type. Such a method may, for example, further include receiving input from one or more users to explore multiple variations of simulated performance of at least the specified task by at least the earth-moving construction and/or mining vehicle of the indicated type, wherein the generating of the data about the simulated operations includes having the at least earth-moving construction and/or mining vehicle of the indicated type complete the simulated performance of the at least specified task for the multiple variations, and wherein the providing of the generated data about the simulated operations includes providing information to the one or more users about the simulated performance for the multiple variations to cause further use of at least one of the multiple variations. Another non-exclusive example of such systems and techniques includes a non-transitory computer-readable medium having stored contents that cause one or more computing devices to perform any of the types of automated operations and/or methods described above. Such a non-transitory computer-readable medium may, for example, further include having the stored contents include software instructions that, when executed by the one or more computing devices, program the one or more computing devices to perform the automated operations. Various other systems, methods and non-transitory computer-readable medium implementations may be used as described elsewhere herein.

In addition, while the autonomous operations of an earth-moving vehicle controlled by the EMVOTC system may in some embodiments be fully autonomous and performed without any input or intervention of any human users, in other embodiments the autonomous operations of an earth-moving vehicle controlled by the EMVOTC system may be only partially autonomous, such as to include providing information to one or more human users about the operations of the EMVOTC system and optionally receiving information from one or more such human users (whether on-site or remote from the site) that are used as part of further automated operations of the EMVOTC system (e.g., one or more target tasks, a high-level work plan, etc.)—such information providing and/or receiving may, for example, occur via one or more GUIs ("graphical user interfaces") displayed on one or more computing device that provide user-selectable controls and other options to allow a user to interactively request or specify types of information to display and/or to interactively provide information for use by the EMVOTC system, such as one or more GUIs provided by the EMVOTC system.

For illustrative purposes, some embodiments are described below in which specific types of data are acquired and used for specific types of automated operations performed for specific types of earth-moving vehicles, and in which specific types of autonomous operation activities are performed in particular manners. However, it will be understood that such described systems and techniques may be used with other types of data and vehicles and associated autonomous operation activities in other manners in other embodiments, and that the invention is thus not limited to the exemplary details provided. In addition, the terms "acquire" or "capture" or "record" as used herein with reference to sensor data may refer to any recording, storage, or logging of media, sensor data, and/or other information related to an earth-moving vehicle or job site or other location or subsets thereof (unless context clearly indicates otherwise), such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify the same or similar elements or acts.

FIG. 1A is a diagram illustrating information 191*a* including an example embodiment of an EMVOTC ("Earth-Moving Vehicle Operation Training and Control") system 140 that may be used to implement at least some of the described systems and techniques for implementing autonomous control of earth-moving vehicles, such as to automatically determine and control fully autonomous movement of an earth-moving vehicle's arm(s) and/or attachment(s) (e.g., digging bucket) and/or body/chassis to move materials or perform other actions in accordance with specified tasks. The EMVOTC system 140 may be implemented on one or more network-accessible configured computing devices 190, whether integrated 100 with a particular earth-moving construction vehicle 170-1 or earth-moving mining vehicle 175-1 (e.g., located on that earth-moving vehicle), or integrated with multiple earth-moving vehicles 170 and/or 175 (e.g., that include earth-moving vehicle 170-1 or 175-1 and further include one or more other earth-moving vehicles 170-*x* and/or 175-*x*, operating in a distributed manner on the multiple earth-moving vehicles, such as one computing device 190 on each of the multiple vehicles that are interacting in a peer-to-peer manner), or instead remote from one or more such earth-moving vehicles 170 and/or 175 (e.g., in communication with one or more such earth-moving vehicles over one or more networks 195, such as from a location on a job site and/or from a remote location). In some embodiments, one or more other computing devices or systems may further interact with the EMVOTC system 140 (e.g., to obtain and/or provide information), such as other computing device(s) 155 each having one or more associated users 150, and/or other computing system(s) 180 (e.g., to store and provide data, to provide supplemental computing capabilities, etc.). The computing device(s) 190 may include any computing device or system that may perform the described techniques as discussed herein, such as to receive data and/or requests, take corresponding actions (e.g., store data, respond to requests, etc.). The earth-moving vehicle(s) 170 and/or 175 may correspond to various types of vehicles and have various forms, such as are illustrated in FIGS. 2A-2I.

In this example, earth-moving vehicle 170-1 or 175-1 includes a variety of sensors to obtain/determine information about the vehicle and its surrounding environment (e.g., a job site on which the vehicle is located), including one or more GPS antennas 220, optionally one or more inertial navigation systems 225, an RTK-enabled GPS positioning unit 230 that receives GPS signals from the GPS antenna(s) and RTK-based correction data from a remote base station (not shown) and optionally other data from one or more other sensors and/or devices (e.g., the inertial navigation system), one or more inclinometers and/or other position sensors 210, one or more track or wheel sensors 235, one or more image sensors 250 (e.g., part of one or more cameras or other image capture devices), one or more LiDAR emitters and/or sensors 260, one or more infrared sensors 270, one or more microcontrollers or other hardware CPUs 255, one or more other components 265 (e.g., radar, ground-penetrating radar, sonar, etc.), etc.

The EMVOTC system 140 obtains some or all of the data from the sensors on the earth-moving vehicle 170-1 or 175-1 (and other vehicles 170 and/or 175 being controlled, if any), stores the data in corresponding databases or other data storage formats on storage 120 (e.g., sensor data 121, earth-moving vehicle information 128, environment information 129, etc.), and uses the data to perform automated operations involving controlling autonomous operations of the earth-moving vehicle 170-1 or 175-1 (and optionally other vehicles 170 and/or 175). In this example embodiment, the EMVOTC system 140 has modules that include an operational data simulator module 147 (e.g., to generate simulated operational data 125 for one or more earth-moving vehicles or vehicle types), an operational data determiner module 141 (e.g., to obtain and prepare actual operational data 123 and/or simulated operational data 125 for the earth-moving vehicle(s) 170 and/or 175 for use in training one or more vehicle behavioral models 127), an operation trainer module 143 (e.g., to use the prepared operational data to train the behavioral model(s) 127), an operational controller module 145 that uses the trained behavioral model(s) to control autonomous operation (e.g., fully autonomous) of the earth-moving vehicle(s) 170 and/or 175 to perform one or more determined tasks, and optionally one or more other modules 149 to perform additional automated operations and provide additional capabilities (e.g., controlling overall operations for a job site, such as by a planner module; analyzing and describing a job site or other surrounding environment, such as by a global 3*d* mapping module, including analyzing information about potential obstacles in an environment of the earth-moving vehicle(s) 170 and/or 175 and optionally determining corresponding information such as a classification of the type of the obstacle; one or more additional AI modules, such as a motion planner module or other operator module that determines how to accomplish a goal that may include moving the earth-moving vehicle(s) 170 and/or 175 from current location(s) to determined target destination location(s), including to determine how to handle any obstacles between the current and destination locations; one or more GUI modules, including to optionally support one or more VR (virtual reality) headsets/glasses and/or one or more AR (augmented reality) headsets/glasses and/or mixed reality headsets/glasses optionally having corresponding input controllers; etc.). During operation, the EMVOTC system may generate or otherwise obtain various types of additional data and optionally store that additional data on storage 120 or elsewhere, such as current location and/or positioning information for an earth-moving vehicle and/or a destination location and/or one or more determined routes (e.g., as part of earth-moving vehicle information 128), obstacle classification data, etc. Additional details related to the EMVOTC system 140 are included elsewhere herein.

In this example embodiment, the one or more computing devices 190 include a copy of the EMVOTC system 140 stored in memory 130 and being executed by one or more hardware CPUs 105—software instructions of the EMVOTC system 140 may further be stored on storage 120 (e.g., for loading into memory 130 at a time of execution), but are not illustrated here. Computing device(s) 190 and EMVOTC system 140 may be implemented using a plurality of hardware components that form electronic circuits suitable for and configured to, when in combined operation, perform at least some of the techniques described herein. In the illustrated embodiment, each computing device 190 includes the hardware CPU(s) 105 (e.g., microprocessors or microcontrollers, optionally including one or more microcontrollers 255), storage 120, memory 130, and various input/output ("I/O") components 110, with the illustrated I/O components including a network connection interface 112, a computer-readable media drive 113, optionally a display 111, and other I/O devices 115 (e.g., keyboards, mice or other pointing devices, microphones, speakers, one or more VR headsets and/or glasses with corresponding input controllers, one or more AR headsets and/or glasses with corresponding input controllers, one or more mixed reality headsets and/or glasses with corresponding input controllers, etc.), although in other embodiments at least some such I/O components may not be provided. The memory may further include one or more optional other executing software programs 135 (e.g., an engine to provide output to one or more VR and/or AR and/or mixed reality devices and optionally receive corresponding input). The other computing devices 155 and computing systems 180 may include hardware components similar to or the same as those of a computing device 190 (and execute software programs, such as executing program(s) 157 on computing device(s) 155), but with those details about hardware components and particular executing software programs being omitted for the sake of brevity.

As noted above, one or more other earth-moving construction vehicles 170-*x* and/or earth-moving mining vehicles 175 may similarly be present (e.g., on the same job site as earth-moving vehicle 170-1 or 175-1) and include some or all such components and modules 210-270 and/or 105-149 (although not illustrated here for the sake of brevity) and have corresponding autonomous operations controlled by the EMVOTC system 140 (e.g., with the EMVOTC system operating on a single earth-moving vehicle and communicating with the other earth-moving vehicles via wireless communications, with the EMVOTC system executing in a distributed manner on some or all of the earth-moving vehicles, etc.) or by another copy of the EMVOTC system (e.g., with each earth-moving vehicle having a separate copy of the EMVOTC system executing on that earth-moving vehicle and optionally operating in coordination with each other, etc.). The network 195 may be of one or more types (e.g., the Internet, one or more cellular telephone networks, etc.) and in some cases may include or be replaced by direct wireless communications between two or more devices (e.g., via Bluetooth; LoRa, or Long Range Radio; etc.). In addition, while the example of FIG. 1A includes various types of data gathered for an earth-moving vehicle and its surrounding environment, other embodiments may similarly gather and use other types of data, whether instead of or in addition to the illustrated types of data, including non-exclusive examples of image data in one or more light spectrums, non-light energy data, location data of types other than from satellite-based navigation systems, depth or distance data to objects, sound data, overhead imagery and other data, etc. In addition, in some embodiments and situations, different devices and/or sensors may be used to acquire the same or overlapping types of data (e.g., simultaneously or sequentially), and the EMVOTC system may combine or otherwise use such different types of data, including to determine differential information for a type of data using multiple sources of that data type.

It will be appreciated that computing devices, computing systems and other equipment (e.g., earth-moving vehicles) included within FIG. 1A are merely illustrative and are not intended to limit the scope of the present invention. The systems and/or devices may instead each include multiple interacting computing systems or devices, and may be connected to other devices that are not specifically illustrated, including via Bluetooth communication or other direct inter-device communication, through one or more networks such as the Internet, via the Web, or via one or more private networks (e.g., mobile communication networks), etc. More generally, a device or other system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, camera devices and accessories, and various other consumer products that include appropriate communication capabilities. In addition, the functionality provided by the illustrated EMVOTC system 140 may in some embodiments be distributed in various modules, some of the described functionality of the EMVOTC system 140 may not be provided, and/or other additional functionality may be provided.

It will also be appreciated that, while various items are illustrated as being stored in memory or on storage while being used, these items or portions of them may be transferred between memory and other storage devices for purposes of memory management and data integrity and execution/use. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the EMVOTC system 140 executing on computing device(s) 190) and/or data structures (e.g., trained vehicle behavioral model(s) 127), such as by execution of software instructions of the one or more software programs and/or by storage of such software instructions and/or data structures, and such as to perform algorithms as described in the flow charts and other disclosure herein. Furthermore, in some embodiments, some or all of the systems and/or modules may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 1B:
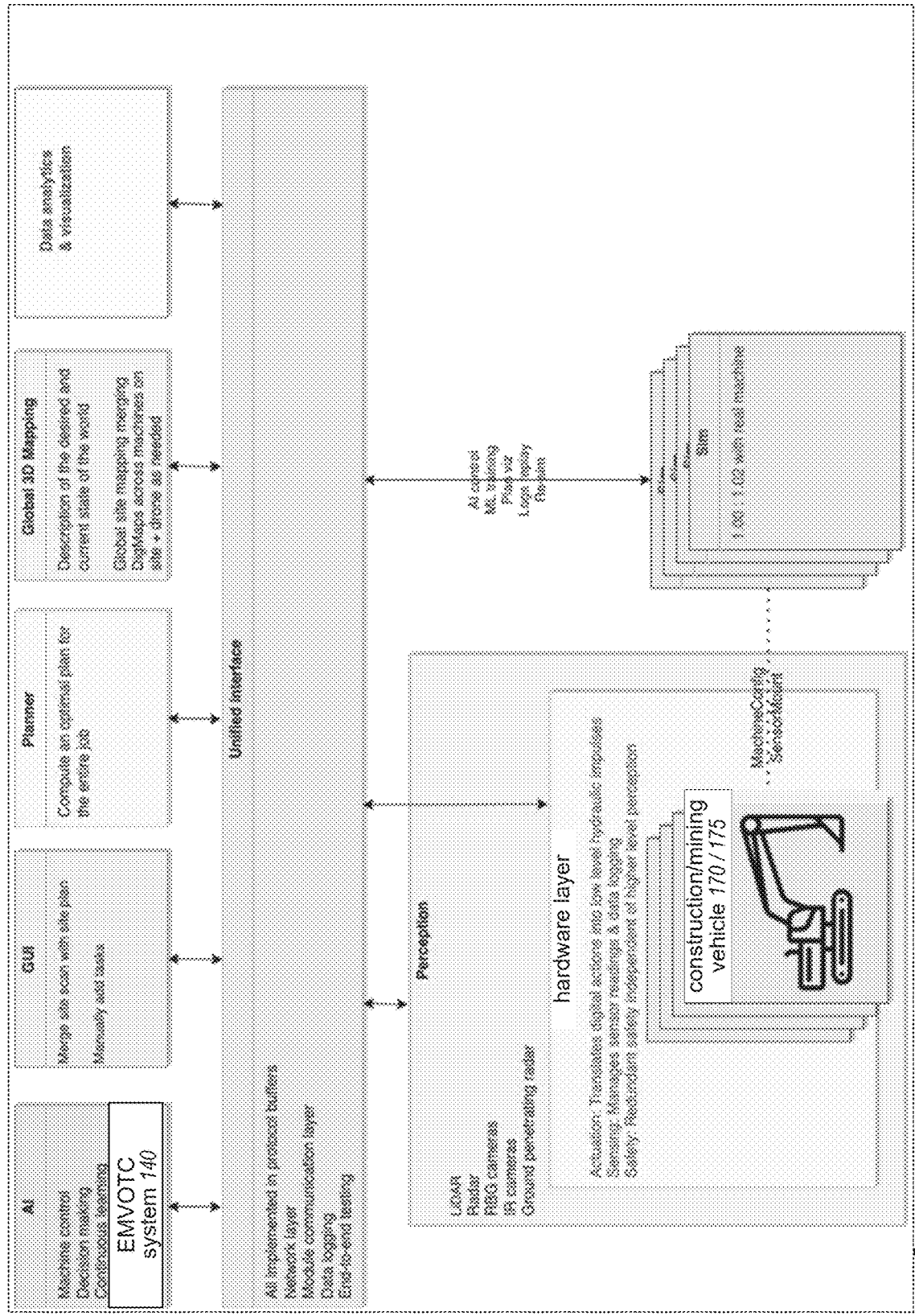
FIG. 1B is a diagram illustrating example components and interactions used to implement autonomous operations of one or more earth-moving construction and/or mining vehicles on a site.

FIG. 1B illustrates example modules and interactions used to implement autonomous operations of one or more earth-moving vehicles on a site, such as to provide an overview of a software and/or hardware architecture used for performing at least some of the described techniques in at least some embodiments. In particular, FIG. 1B illustrates information 191b that includes a hardware layer associated with one or more types of earth-moving construction vehicles 170 and/or earth-moving mining vehicles 175 (e.g., corresponding to components 210-270 of FIG. 1A), such as to receive instructions about controlling autonomous operation of the earth-moving vehicle(s) 170/175, and to perform actions that include actuation (e.g., translating digital actions into low-level hydraulic impulses), sensing (e.g., to manage sensor readings and data logging), safety (e.g., to perform redundant safety independent of higher-level perception operations), etc. In the illustrated example, the hardware layer interacts with or as part of a perception module, such as to use one or more sensor types to obtain data about the earth-moving vehicle(s) and/or their environment (e.g., LiDAR data, radar data, visual data from one or more RGB camera devices, infrared data from one or more IR sensors, ground-penetrating radar data, etc.). The perception module and/or hardware layer may further interact with a unified interface that connects various modules, such as to operate a network layer and to be implemented in protocol buffers as part of providing a module communication layer, as well as to perform data logging, end-to-end testing, etc. In the illustrated example, the unified interface further interacts with an AI (artificial intelligence) module (e.g., that includes the EMVOTC system 140), a GUI module, a Planner module, a Global 3D Mapping module, one or more Sim simulation modules (e.g., operational data simulator modules 147 that are part of the EMVOTC system 140), and one or more other modules to perform data analytics and visualization. In this example, the AI module provides functionality corresponding to machine control, decision-making, continuous learning, etc. The GUI module perform activities that include providing information of various types to users (e.g., from the EMVOTC system), manually receiving information (e.g., to be provided to the EMVOTC system, to add tasks to be performed, to merge a site scan with a site plan, etc.). The Planner module performs operations that may include computing an optimal plan for an entire job (e.g., with various tasks to be performed in sequence and/or serially), and the Global 3D Mapping module performs activities that may include providing a description of a current state and/or desired state of an environment around the earth-moving vehicle(s), performing global site mapping merging (e.g., using DigMaps across earth-moving vehicles on the site and optionally drones), etc. The one or more Sim modules perform simulations to provide data from simulated operation of the one or more earth-moving vehicles, such as for use in AI control, machine learning neural network training (e.g., for one or more behavioral models), replaying logs, planning visualizations, etc. It will be appreciated that the EMVOTC system may be implemented in other architectures and environments in other embodiments, and that the details of FIG. 1B are provided for illustrative purposes. In addition, while not illustrated in FIG. 1B, in some embodiments one or more specialized versions of the EMVOTC system may be used for particular types of earth-moving vehicles, with non-exclusive examples including the following: an Excavator Operation and Training Control, or EOTC, system to control one or more types of construction and/or mining excavator vehicles; an Excavator X Operation and Training Control, or EXOTC, system to control a particular construction and/or mining excavator X vehicle; a Dump Truck Operation and Training Control, or DTOTC, system to control one or more types of construction and/or mining dump truck vehicles; a Dump Truck/X Operation and Training Control, or DTXOTC, system to control a particular construction and/or mining dump truck vehicle; a Wheel Loader Operation and Training Control, or WLOTC, system to control one or more types of construction and/or mining wheel loader vehicles; a Wheel Loader X Operation and Training Control, or WLXOTC, system to control a particular construction and/or mining wheel loader vehicle; one or more other operation and training control systems specific to particular types of construction and/or mining vehicles other than excavators and dump trucks and wheel loaders; one or more other operation and training control systems specific to particular construction and/or mining vehicles other than excavators and dump trucks and wheel loaders; a Construction Vehicle Operation and Training Control, or CVOTC, system to control some or all types of construction vehicles; a Mining Vehicle Operation and Training Control, or MVOTC, system to control some or all types of mining vehicles; etc.).

FIGS. 2A-2I illustrate examples of earth-moving vehicles and types of on-vehicle data sensors positioned to support autonomous operations on a site.

Figure 2A:
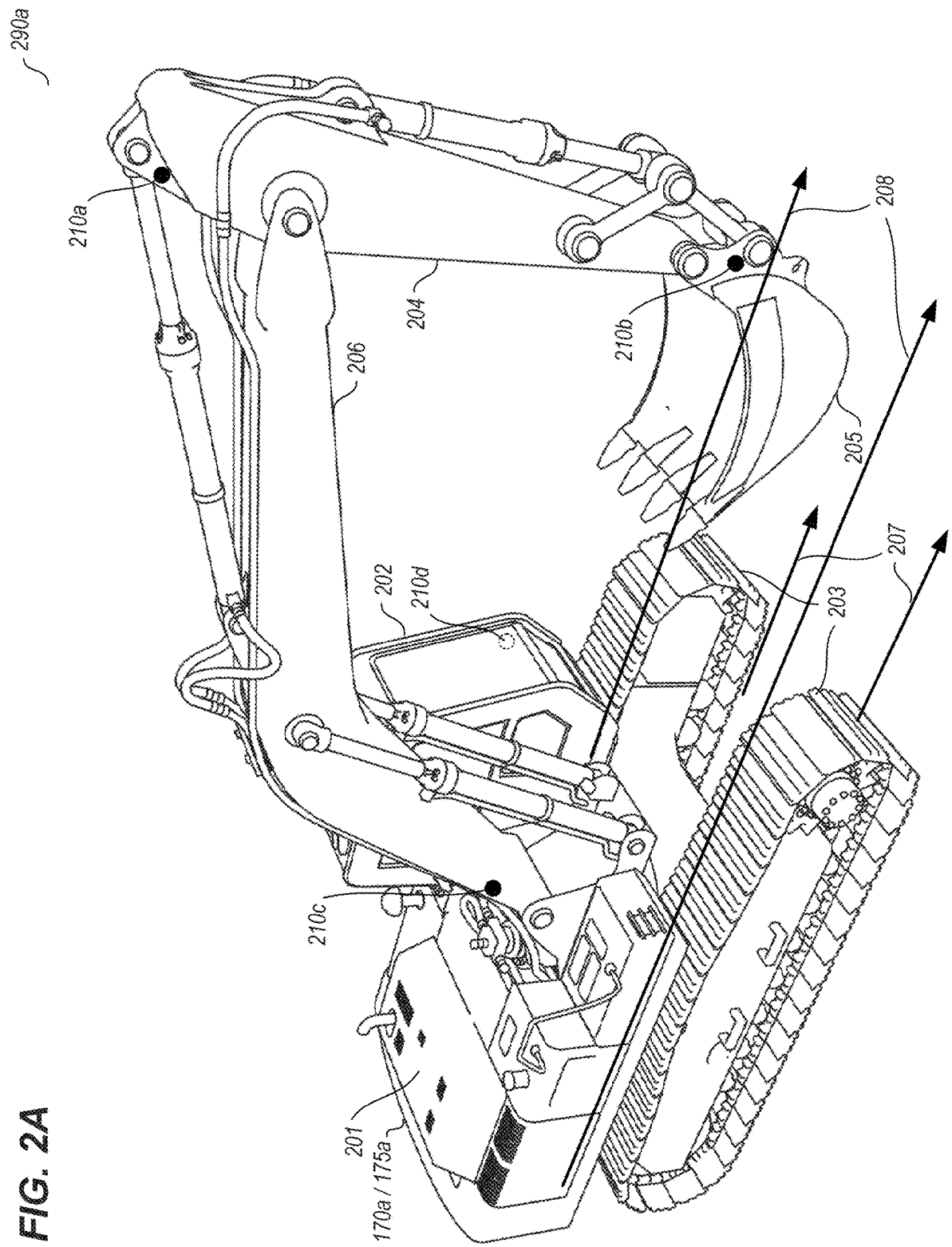

In particular, with respect to FIG. 2A, information 290a about an example earth-moving construction vehicle 170a and/or mining vehicle 175a is illustrated, which in this example is a tracked excavator vehicle, using an upper-side-frontal view from the side of the digging boom arm 206 and stick arm (or 'stick') 204 and opposite the side of the cabin 202, with the earth-moving vehicle 170a/175a further having a main body chassis 201 (e.g., enclosing an engine and counterweight, and including the cabin 202), tracks 203 and bucket (or 'scoop' or 'claw') attachment 205—in other embodiments, digging arm attachments other than a bucket may be used such as, for example, a hydraulic thumb, coupler, breaker, compactor, digging bucket, grading bucket, hammer, demolition grapple, tiltrotator, etc. Four example inclinometers 210 are further illustrated at positions that beneficially provide inclinometer data to compute the location of the bucket and other parts of the digging arms relative to the cabin of the earth-moving vehicle. In this example, three inclinometers 210a-210c are mounted at respective positions on the digging arms of the earth-moving vehicle (position 210c near the intersection of the digging boom arm and the body of the earth-moving vehicle, position 210b near the intersection of the digging stick arm and the bucket attachment, and position 210a near the intersection of the digging boom and stick arms), such as to use single-axis inclinometers in this example, and with a fourth inclinometer 210d mounted within the cabin of the earth-moving vehicle and illustrated at an approximate position using a dashed line, such as to use a dual-axis inclinometer that measures pitch and roll-data from the inclinometers may be used, for example, to track the position of the earth-moving vehicle arms/attachment, including when a track heading direction 207 is determined to be different from a cabin/body heading direction 208 (not shown in this example). It will be appreciated that other quantities, positionings and types of inclinometers may be used in other embodiments.

Figure 2B:
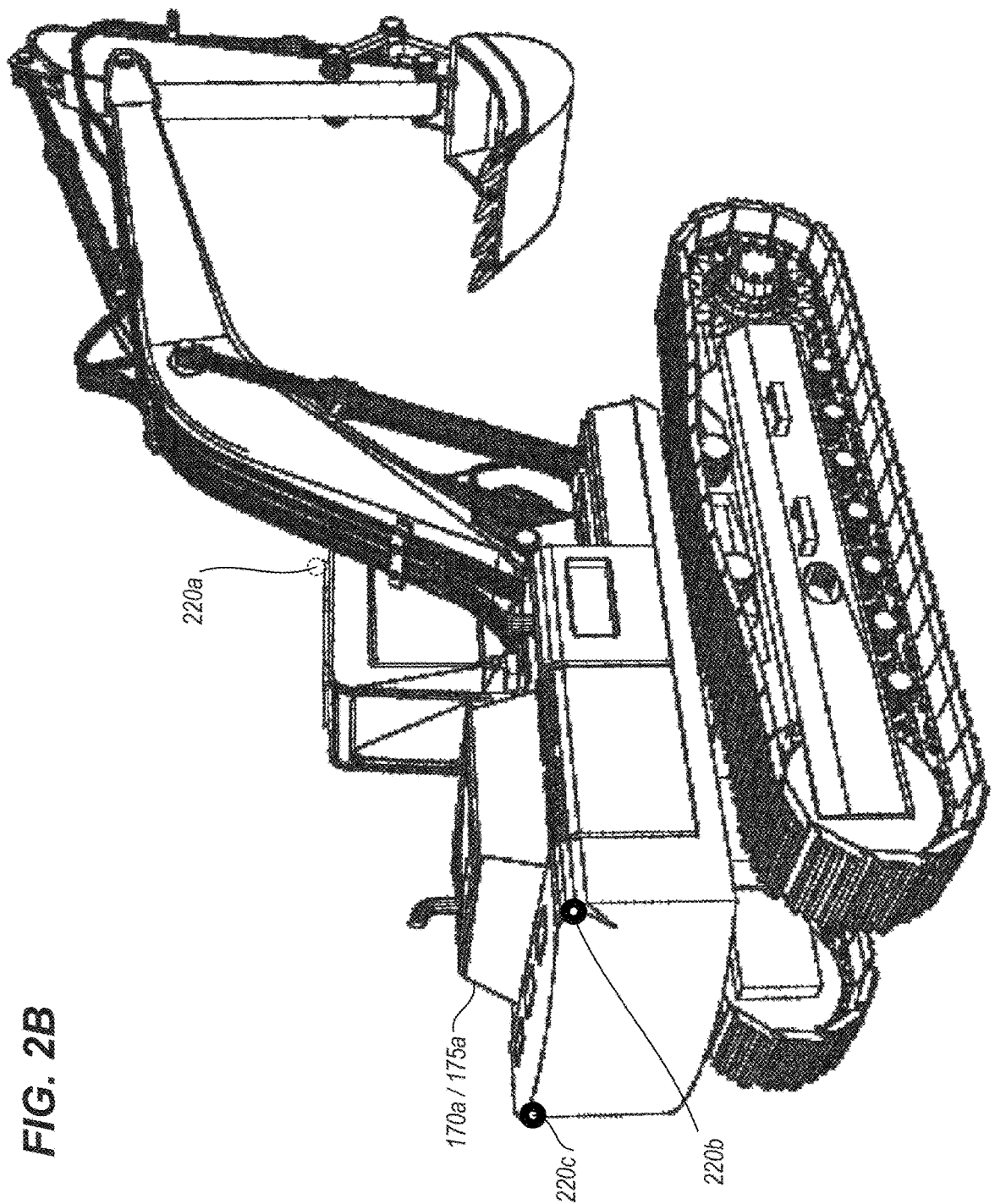

FIGS. 2B and 2C continue the example of FIG. 2A, and illustrate information 290b and 290c, respectively, about three example GPS antennas 220 at positions that beneficially provide GPS data to assist in determining the positioning and direction of the cabin/body of the earth-moving vehicle 170a/175a, including to use data from the three GPS antennas to provide greater precision than is available from a single GPS antenna. In this example, the three GPS antennas 220a-220c are positioned on the earth-moving vehicle body chassis and proximate to three corners of the chassis (e.g., as far apart from each other as possible), such that differential information between GPS antennas 220a and 220c may provide cabin heading direction information, and differential information between GPS antennas 220b and 220c may provide lateral direction information at approximately 90° from that cabin heading direction information. In particular, in FIG. 2B, the example earth-moving vehicle is shown using a side-rear view from the side of the arms, with GPS antennas 220b and 220c illustrated on the back of the body chassis at or below the top of that portion of the body chassis, and with an approximate position of GPS antenna 220a on the cabin top near the front illustrated with dashed lines (e.g., as illustrated further in FIG. 2C). In FIG. 2C, the example earth-moving vehicle is shown using an upper-side-frontal view from the side of the cabin, with GPS antenna 220a shown on the cabin top near the front on the same side as GPS antenna 220c, and with the positions of GPS antennas 220b and 220c illustrated through the body chassis with dashed lines (e.g., just below the top of the back of the body chassis, as illustrated in FIG. 2B). While not illustrated in FIGS. 2B-2C, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the earth-moving vehicle is located) to improve accuracy of the GPS signals from the GPS antennas, so as to be part of one or more RTK-enabled GPS positioning units. It will be appreciated that other quantities, positionings and types of GPS antennas (and/or antennas for other types of satellite-based navigation systems) may be used in other embodiments.

Figure 2D:
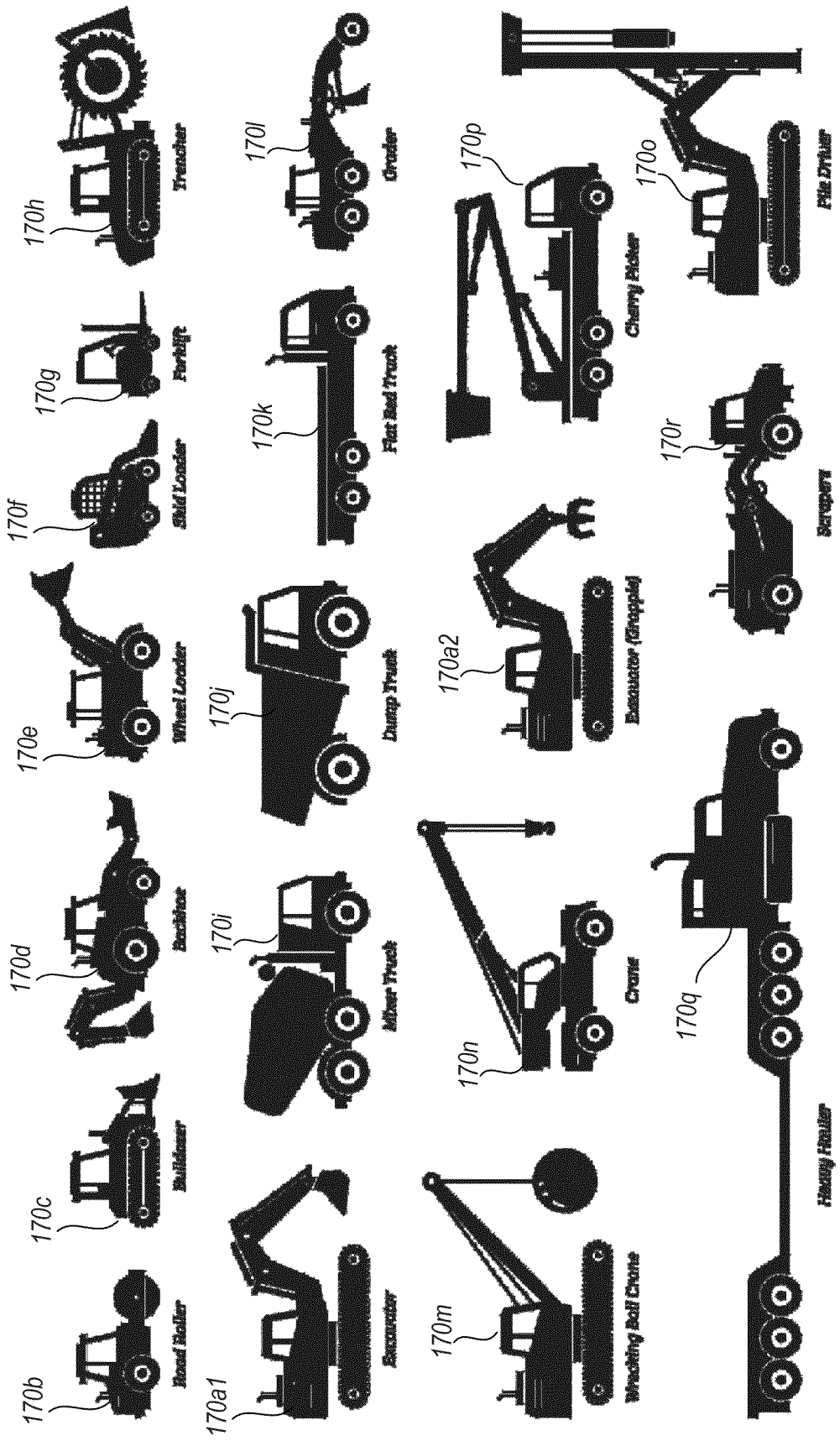

FIGS. 2D-2I continue the examples of FIGS. 2A-2C, with FIG. 2D illustrating information 290d about a variety of non-exclusive example types of earth-moving construction vehicles 170 that may be controlled by embodiments of the EMVOTC system, including two example earth-moving tracked construction excavator vehicles 170a shown with different attachments (excavator vehicle 170a1 with a bucket attachment, and excavator vehicle 170a2 with a grapple attachment) that may be controlled by the EMVOTC system. Other example types of earth-moving construction vehicles 170 that are illustrated include a bulldozer 170c; a backhoe loader 170d; a wheel loader 170e; a skid steer loader 170f; a dump truck 170j; a forklift 170g; a trencher 170h; a mixer truck 170i; a flatbed truck 170k; a grader 170l; a wrecking ball crane 170m; a truck crane 170n; a cherry picker 170p; a heavy hauler 170q; a scraper 170r; a pile driver 170o; a road roller 170b; etc. It will be appreciated that other types of earth-moving construction vehicles may similarly be controlled by the EMVOTC system in other embodiments. In a similar manner, FIG. 2E illustrates information 290e about a variety of non-exclusive example types of earth-moving mining vehicles 175 that may similarly be controlled by embodiments of the EMVOTC system, including several example earth-moving tracked mining excavator vehicles 175a shown with different attachments (excavator vehicle 175a1 with a bucket attachment, excavator vehicle 175a3 with a dragline attachment, excavator vehicle 175a4 with a clamshell extractor attachment, excavator vehicle 175a5 with a front shovel attachment, excavator vehicle 175a6 with a bucket wheel extractor attachment, excavator vehicle 175a7 with a power shovel attachment, etc.) that may be controlled by the EMVOTC system. Other example types of earth-moving mining vehicles 175 that are illustrated include a dump truck 175m; an articulated dump truck 175n; a mining dump truck 175b; a bulldozer 175c; a scraper 175d; a tractor scraper 175g; a wheel loader 175e; a wheeled skid steer loader 175f; a tracked skid steer loader 175i; a wheeled excavator 175h; a backhoe loader 175k; a motor grader 175j; a trencher 175l; etc. It will be appreciated that other types of earth-moving mining vehicles may similarly be controlled by the EMVOTC system in other embodiments.

Figure 2F:
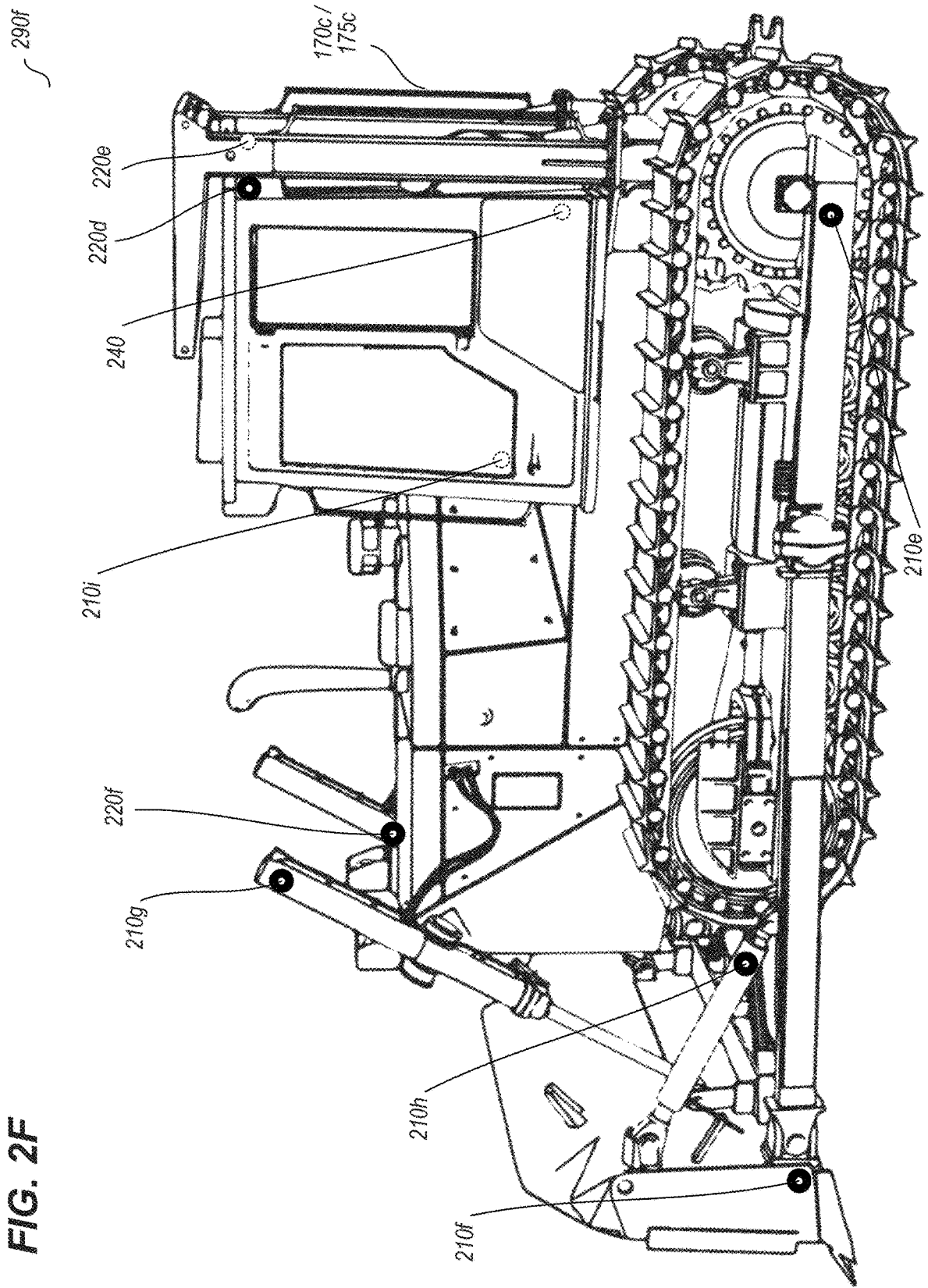

FIGS. 2F and 2G illustrate further example details about another earth-moving construction vehicle 170c and/or mining vehicle 175c, which in this example is a bulldozer vehicle, such as to illustrate example positions for GPS receivers 220 and/or inclinometers 210. In particular, FIG. 2F illustrates example information 290f that includes various example inclinometers 210e-210i, and example GPS antennas/receivers 220d-220f. The example inclinometers 210e-210i are further illustrated at positions that beneficially provide inclinometer data to compute the location of the blade or other front attachment (and optionally other parts of the bulldozer, such as the hydraulic arms) relative to the cabin of the bulldozer vehicle (e.g., at position 210e near the intersection of the track spring lifting arm and the body of the vehicle, position 210f near the intersection of the track spring lifting arm and the blade or other attachment, position 210g at one end of a hydraulic arm, position 210h at one end of the tilt cylinder, etc.), such as to use single-axis inclinometers in this example, and with another inclinometer 210i mounted within the cabin of the vehicle and illustrated at an approximate position using a dashed line, such as to use a dual-axis inclinometer that measures pitch and roll-data from the inclinometers may be used, for example, to track the position of the track spring lifting arm and attachment relative to the cabin/body of the vehicle. The example GPS antennas/receivers 220 are further illustrated at positions that beneficially provide GPS data to assist in determining the positioning and direction of the cabin/body, including to use data from the three GPS antennas to provide greater precision than is available from a single GPS antenna. In this example, the three GPS antennas 220d-220f are positioned on the body chassis and proximate to three corners of the chassis (e.g., as far apart from each other as possible), such that differential information between GPS antennas 220f and 220e may provide cabin heading direction information, and differential information between GPS antennas 220d and 220e may provide lateral direction information at approximately 90° from that cabin heading direction information. In particular, in FIG. 2F, the example earth-moving vehicle is shown using a side view, with GPS antennas 220d and 220e illustrated on the back of the body chassis at or below the top of that portion of the body chassis (using dashed lines to illustrate position 220e), and with an approximate position of GPS antenna 220f on the chassis top near the front—the positions 220d-220f are further illustrated in information 290g of FIG. 2G, in which the example earth-moving vehicle is shown using an upper-side-back view, with GPS antenna 220f shown on the body top near the front on the same side as GPS antenna 220e. While not illustrated in FIGS. 2F-2G, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. It will be appreciated that other quantities, positionings and types of GPS antennas (and/or antennas for other types of satellite-based navigation systems) and/or inclinometers and/or other sensors may be used in other embodiments.

Figure 2H:
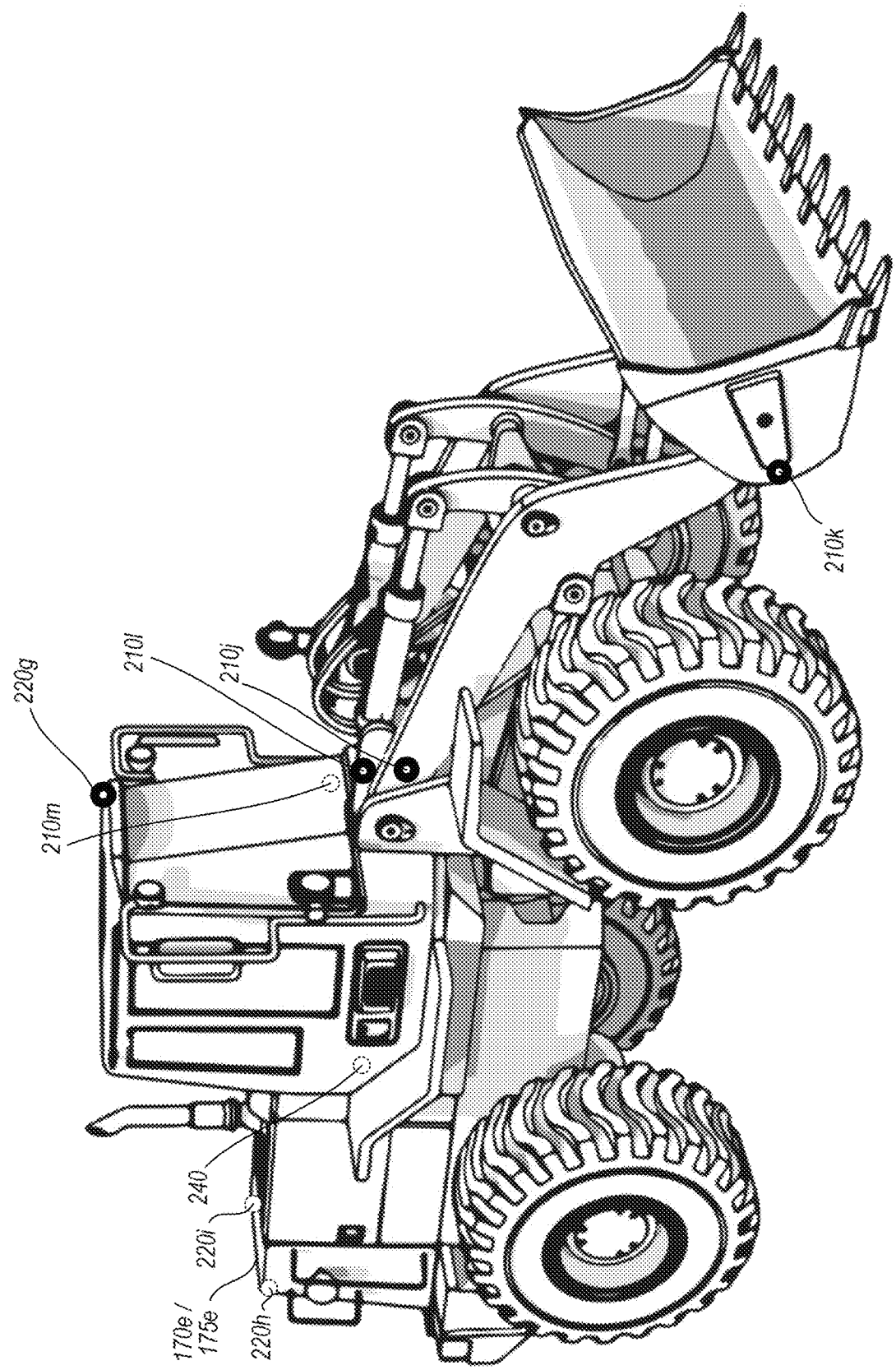
Figure 2I:
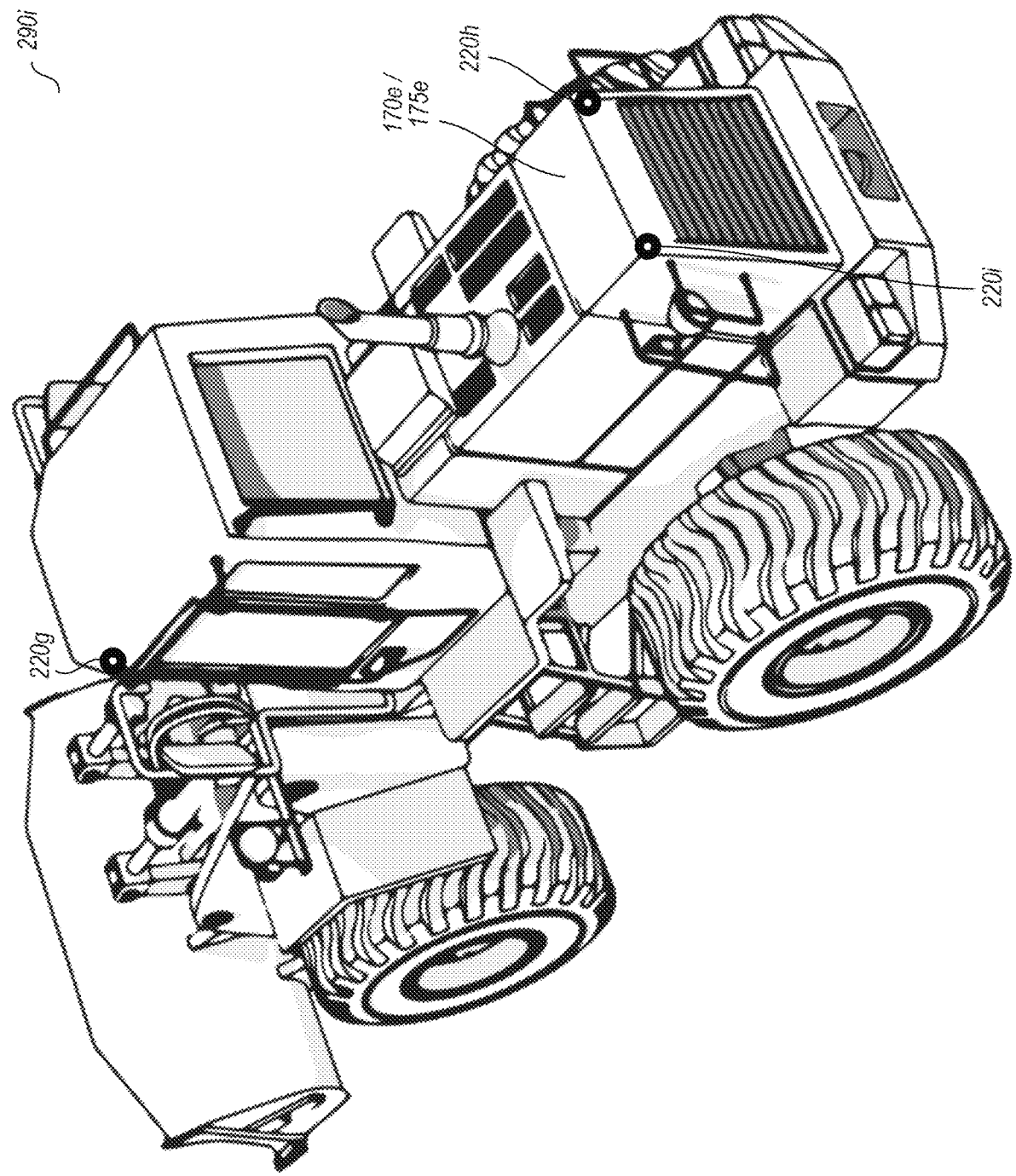

FIGS. 2H and 2I illustrate further example details about another earth-moving construction vehicle 170e and/or mining vehicle 175e, which in this example is a wheel loader vehicle, such as to illustrate example positions for GPS receivers 220 and/or inclinometers 210. In particular, FIG. 2H illustrates example information 290h that includes various example inclinometers 210j-210m, and example GPS antennas/receivers 220g-220i. The example inclinometers 210j-210m are further illustrated at positions that beneficially provide inclinometer data to compute the location of the bucket or other front attachment (and optionally other parts of the wheel loader, such as the hydraulic arms) relative to the cabin of the loader vehicle (e.g., at position 210j near the intersection of the boom lifting arm and the body of the vehicle, position 210k near the intersection of the boom lifting arm and the bucket or other attachment, position 210l at one end of a hydraulic arm, etc.), such as to use single-axis inclinometers in this example, and with another inclinometer 210m mounted within the cabin of the vehicle and illustrated at an approximate position using a dashed line, such as to use a dual-axis inclinometer that measures pitch and roll-data from the inclinometers may be used, for example, to track the position of the boom lifting arm and attachment relative to the cabin/body of the vehicle. The example GPS antennas/receivers 220 are further illustrated at positions that beneficially provide GPS data to assist in determining the positioning and direction of the cabin/body, including to use data from the three GPS antennas to provide greater precision than is available from a single GPS antenna. In this example, the three GPS antennas 220g-220i are positioned on the body chassis and proximate to three corners of the chassis (e.g., as far apart from each other as possible), such that differential information between GPS antennas 220g and 220i may provide cabin heading direction information, and differential information between GPS antennas 220h and 220i may provide lateral direction information at approximately 90° from that cabin heading direction information. In particular, in FIG. 2H, the example earth-moving vehicle is shown using a side-frontal view, with GPS antennas 220h and 220i illustrated on the back of the body chassis at or below the top of that portion of the body chassis (using dashed lines to illustrate their positions), and with an approximate position of GPS antenna 220g on the chassis top near the front—the positions 220g-220i are further illustrated in information 290i of FIG. 2I, which is shown using an upper-side-back view, with GPS antenna 220g shown on the body top near the front on the same side as GPS antenna 220i. While not illustrated in FIGS. 2H and 2I, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. It will be appreciated that other quantities, positionings and types of GPS antennas (and/or antennas for other types of satellite-based navigation systems) and/or inclinometers and/or other sensors may be used in other embodiments.

Figure 2J:
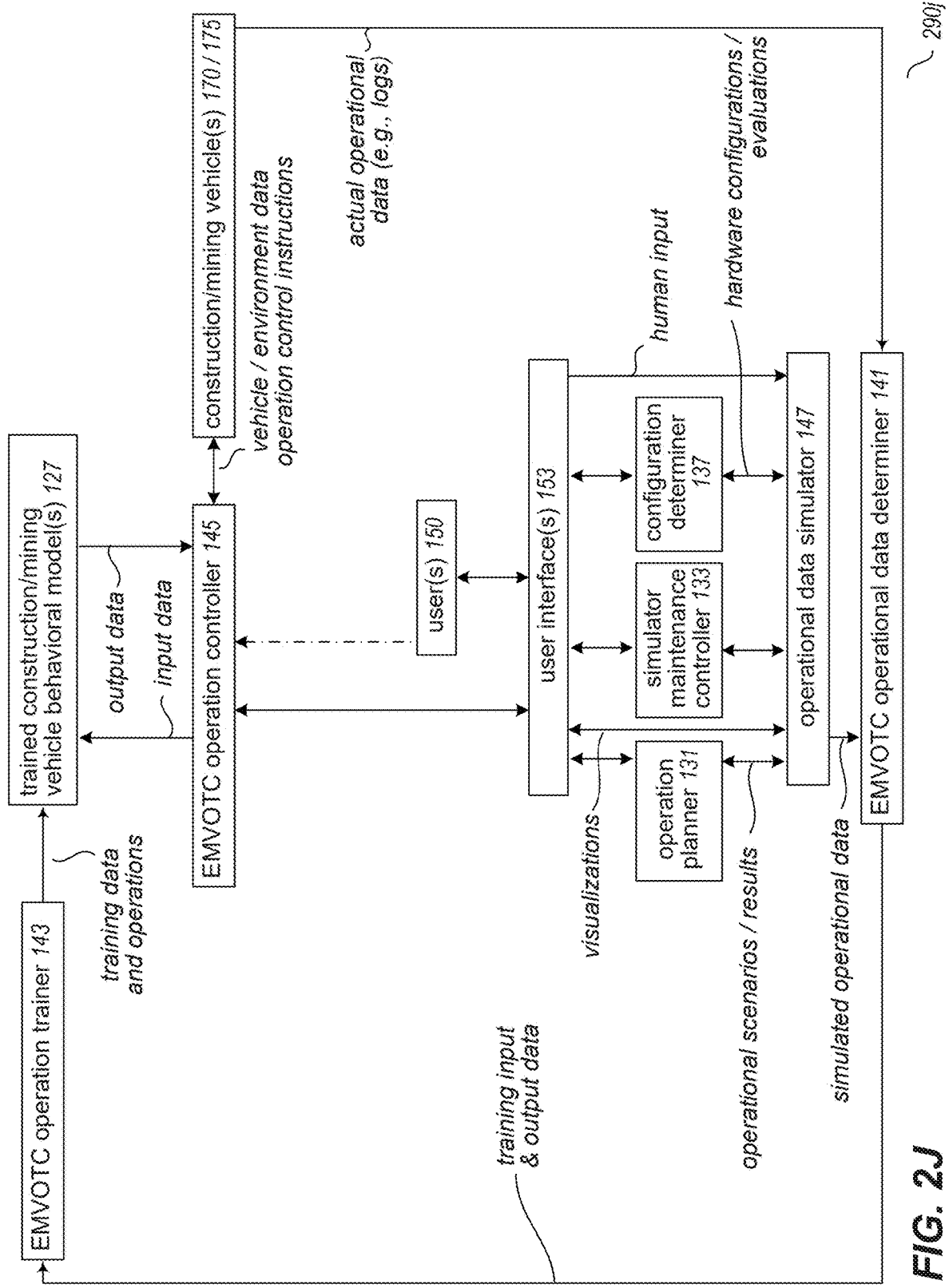
FIG. 2J illustrates examples of components and interactions and information used in generating data from simulated operation and using the data as part of implementing autonomous operations of one or more earth-moving construction and/or mining vehicles on a site.

FIG. 2J illustrates examples of modules and interactions and information used in generating and using simulated operational data in various manners, including in combination with actual operational data as part of training a behavioral model to implement autonomous operations of one or more earth-moving vehicles. In particular, FIG. 2J illustrates information 290j about an earth-moving vehicle behavioral model 127 that is implemented in this example embodiment as a neural network with multiple layers (not shown), such as an input sequential layer, one or more first hidden layers, a concatenation layer, one or more additional hidden layers, and an output layer. In this example, an EMVOTC operational data determiner module 141 receives actual operational data from actual operation of one or more earth-moving vehicles 170 and/or 175 (e.g., one or more earth-moving tracked excavator vehicles 170a and/or 175a) by one or more human operators, and simulated operational data from simulated operation of such earth-moving vehicles from one or more operational data simulator modules 147—the module 141 then prepares the received operational data and provides it to an EMVOTC operation trainer for use as training data. The simulator module(s) 147 may perform simulations to generate the simulated operational data as discussed in greater detail elsewhere herein, and optionally include a dynamic delay noise generator for generating strategic delay noise data that is added to simulate/represent at least one of: delay of a human operator on the operator control(s); delay of input from a trained behavioral model being used to perform autonomous operations; hydraulic resistance delay; network delays and interferences, sensor noise, Gaussian (mathematical) noise (for overcoming overfitting problem with insufficient raw data); etc. The EMVOTC operation trainer module 143 uses the received training data to supply training input and output data to the behavioral model 127 in order to train the model, including to use the training data to generate and perform error/loss backpropagation to improve the operation of the model. Once the behavioral model is sufficiently trained, an EMVOTC operation controller module 145 may use the trained behavioral model to control autonomous operations of one or more of the earth-moving vehicle(s) 170 and/or 175, such as to supply input data to the behavioral model 127 corresponding to a current state and environment of the earth-moving vehicle(s) (e.g., received from the earth-moving vehicle(s) and/or one or more other sources, not shown) and about one or more tasks be performed (e.g., from a planner module or other source, not shown), and to receive corresponding output data that the module 145 uses to provide operation control instructions to the earth-moving vehicle(s). As one non-exclusive example, the operation control instructions may simulate inputs to the control panel on an earth-moving vehicle that would be used by a human operator, if one were present—for example, a command may represent joystick deflection (e.g., for one or both of two joysticks, each with 2 axes), activation of a tool control button on one of the joysticks for controlling the tool attachment (e.g., claw, bucket, hammer, etc.), pedal position (e.g., for one or both of two pedals, analogous to car pedals but with a zero position in the middle and with the pedal able to move forward or backward), etc., such as using a number between −1 and 1. In some embodiments, behavioral models may be further refined and/or fine-tuned via data generated from the feedback loops via an operational data simulator module and physical machines according to one or more optimization criteria, such as one or more of operational speed, digging performance (e.g., volumes), operational safety, machine safety (e.g., health), etc. Such a reinforcement loop may, for example, generate further data for the behavioral machine learning models, such as to focus on creating new training episodes in which the behavioral models have less certainty on the state of the environment or the outcome of results of the action that will be taken by the behavioral models. A combination of actual operational data from human operators with various skill levels and data from simulated operation provides for reinforcement learning at a large scale to achieve superior performance and safety of the behavioral model. In one embodiment, the behavioral model achieves at least 17% efficiency improvement and 20× duty cycle improvement over human operators and proportional fuel efficiency can also be achieved. Examples of possible fuel and productivity efficiency improvements from simulator experiments are shown in the table below.

| Control Type | Model | Training Time | Simulator Productivity m3/hour | *Simulator Energy Consumption | Fuel Efficiency |
|---|---|---|---|---|---|
| Human | — | — | 113.94 | 1 | 113.94 |
| AI | Behavioral Cloning (BC) | 0 Epoch | 0 | 1.282 | 0 |
| AI | BC | 1 Epoch | 27.02 | 1.308 | 20.65749235 |
| AI | BC | 20 Epoch | 89.38 | 1.179 | 75.81000848 |
| AI | BC + Preproccessing | 20 Epoch | 121.91 | 0.946 | 128.8689218 |
| AI | BC + Preprocessing + HP Search | 20 Epoch | 128.74 | 0.953 | 135.089192 |

*A relative calculation of total applied input over an excavation process by AI/human Further, such described techniques may be used in some embodiments to enhance the performance of human operators who, for example, may optionally remain in the cabin of an earth-moving vehicle being controlled by the EMVOTC system to monitor the autonomous control (e.g., to monitor aspects of production) or may otherwise be in a position to perform such monitoring (e.g., at a remote location).

FIG. 2J further illustrates additional modules that may interact with the simulator module(s) 147 to use simulated operational data in other manners, whether in addition to or instead of using it for training the vehicle behavioral model(s) 127. In particular, one or more users 150 may use one or more user interface(s) 153 (e.g., a GUI displayed on a computing device or provided via a VR and/or AR and/or mixed reality system) to perform one or more interactions that involve the simulator module(s) 147, such as one or more of the following: to interact with a planner module 131 that uses the simulator module(s) 127 to simulate one or more plans of the planner module 131 and compute an optimal plan for an entire job or to otherwise specify operational scenarios and receive simulated results, such as for use in determining optimal or otherwise preferred implementation plans to use for one or more tasks and/or multi-task jobs or to otherwise enable user what-if experimentation activities; to interact with a configuration determiner module 137 that uses the simulator module(s) 127 to determine optimal or otherwise preferred hardware component configurations to use; to interact with a simulator maintenance controller 133 to implement various types of maintenance activities; to directly supply human input for use by the simulator module(s) 147 (e.g., configuration parameters, settings, etc.); to request and receive visualizations of simulated operations and/or simulated operational data; etc. The planner module 131 may, for example, be independently developed through the design of artificial intelligence, and a plurality of plans from the planner module 131 may be input to the same trained model without having to train new models. It will be appreciated that simulated operational data may be used in other manners in other embodiments, and that interactions with such simulator module(s) may be performed in other manners in other embodiments.

In some embodiments, the machine learning model(s) and/or associated component(s) (e.g., operation trainer module 143 and/or operation controller module 145) may perform various operations, such as one or more of the following: learn information such as noise, dynamics, machine response to inputs, etc.; use reinforcement learning for training some or all of the model(s); perform experimentation, such as to experiment with optimization criteria (e.g., distance between destination position and bucket end position, such as to try to move it closer to be exactly same; speed optimization; prediction loss, such as differences between machine prediction and actual movements; amount of materials to dig up, etc.) and/or to experiment with different motions of obstacle removal or avoidance; try different hardware sensor types/locations to see the results from the simulator engine (e.g., which works best); generate rendered visualizations (e.g., visualizations such as those illustrated with respect to FIGS. 2L-2P, such as by using 'unreal engine' from Epic Games); receive and use input from multiple human operators as part of actual operational data (e.g., to account from variations in operational controls); have multiple instances of the model(s) and/or associated components, whether simultaneously and/or sequentially, and whether operating in conjunction with each other (e.g., in a peer-to-peer manner) and/or independently, and whether performing the same task (optionally with different variations) and/or different tasks (e.g., different types of earth-moving vehicles, different types of operations for one or more types of earth-moving vehicles, etc.); apply noise to training data inputs; apply noise to output of the model(s) (e.g., for the purpose of use as training data); be implemented by modeling movements of earth-moving vehicle controls (e.g., joysticks, foot pedals, etc.), such as to translate them into velocity and displacement of vehicle parts (e.g., pistons and hydraulics); produce DIGMAP information or other 2D representations to represent the terrain (e.g., calculated with a modeled perception system of an earth-moving vehicle), such as for use by a planner module; etc. In addition, in at least some embodiments, the In addition, information regarding differential equations and other physical movement kinematics dynamics information for an example earth-moving vehicle 170a/175a, such as a tracked excavator vehicle, may be used by the operational data simulator module 147 in simulating operations of such an earth-moving vehicle. Such movement dynamics information may, for example, include 'working range' distances and angles for movements of arm(s)/attachment(s), such as for a bucket/scoop attachment on an excavator vehicle—as non-exclusive examples, an excavator vehicle may have a maximum digging depth between approximately 20-40 feet, a maximum reach at ground level between approximately 30-55 feet, a maximum cutting height between approximately 30-45 feet, a maximum loading height between approximately 15-40 feet, a minimum loading height between approximately 4-10 feet, a maximum depth cut for level bottom between approximately 15-25 feet, a maximum vertical wall digging depth between approximately 15-40 feet, etc. In at least some such embodiments, the operational data simulator module may use various movement-related equations as part of its operations, such as to include the following:

Position

Derivative: $r(t)$

Integral: $r(t) = r_0 + \int_0^t v \, dt'$

Velocity

Derivative: $v(t) = \dfrac{dr}{dt}$

Integral: $v(t) = v_0 + \int_0^t a \, dt'$

Acceleration

Derivative: $a(t) = \dfrac{dv}{dt} = \dfrac{d^2 r}{dt^2}$

Integral: $a(t)$ $$W = \int_a^b F(x) d^X$$

Then composes to the full law of motion:

$$x(t) = x_0 + \int_0^t v(\tau) d\tau =$$

$$x_0 + \int_0^t v_0 e^{-\frac{k}{m}\tau} d\tau = x_0 - \frac{mv_0}{k}\left(e^{-\frac{k}{m}t} - 1\right) = x_0 + \frac{mv_0}{k}\left(1 - e^{-\frac{k}{m}t}\right)$$

Joint Physics: Simulation of hydraulic physics may in at least some embodiments be calculated with state-based approximations.

1—Idle—No input is applied after SlowDown state is transitioned out completely (model assumes no movement in the joints)

2—WindUp—in seconds, time between start input and start of motion, with delay caused by the pilot hydraulics getting pressurized before opening valves on the main hydraulics.

3—SpeedUp—interpolation until speed reaches MaxAngularSpeed, as ease into the target angular velocity. Formula of the SpeedUp:

Alpha=Clamp(timedelta,0.0,SpeedUpCoefficient)/
SpeedUpCoefficient

InterpolationEaseOut(0.0, Desired Angular Velocity, Alpha, 2.0)

4—Sustain—When input is stopped, until speed reaches 0, keeping steady at the target angular velocity 5—SlowDown—Ease out of the target angular velocity and ease in to zero. Formula for SlowDown:

Alpha=Clamp(timedelta,DesiredVelocityAtStart,
SlowDownCoefficient)/SlowDownCoefficient InterpolationEaseOut(0.0, Desired Angular Velocity, Alpha, 2.0)

Different Windup/SpeedUp/Sustain/SlowDown times may be used based on the machines and conditions for domain randomization purposes. Additional details for an example embodiment are included in "Kinematic And Isotropic Properties Of Excavator Mechanism", Hareesha N G and K N Umesh, International Journal Of Engineering Research & Technology (IJERT) Volume 3 Issue 17, 2015, which is incorporated herein by reference in its entirety. It will be appreciated that the operational data simulator module may use other equations in other embodiments, whether for earth-moving vehicles with the same or different attachments and/or for other types of earth-moving vehicles. In at least some embodiments, the operational data simulator module may, for example, simulate the effect of wet sand on the terrain. More generally, use of the operational data simulator module may perform experimentation with different alternatives (e.g., different sensors or other hardware components, component placement locations, hardware configurations, etc.) without actually placing them on physical earth-moving vehicles and/or for different environmental conditions without actually placing earth-moving vehicles in those environmental conditions, such as to evaluate the effects of the different alternatives and use that information to implement corresponding setups (e.g., to perform automated operations to determine what hardware components to install and/or where to install it, such as to determine optimal or near-optimal hardware components and/or placements; to enable user-driven operations that allow a user to plan out, define, and visualize execution of a job; etc.). Furthermore, such data from simulated operation may be used in at least some embodiments as part of training one or more behavioral machine learning models for one or more earth-moving vehicles (e.g., for one or more types of earth-moving vehicles), such as to enable generation of corresponding trained models and methodologies (e.g., at scale, and while minimizing use of physical resources) that are used for controlling autonomous operations of such earth-moving vehicles.

Figure 2L:
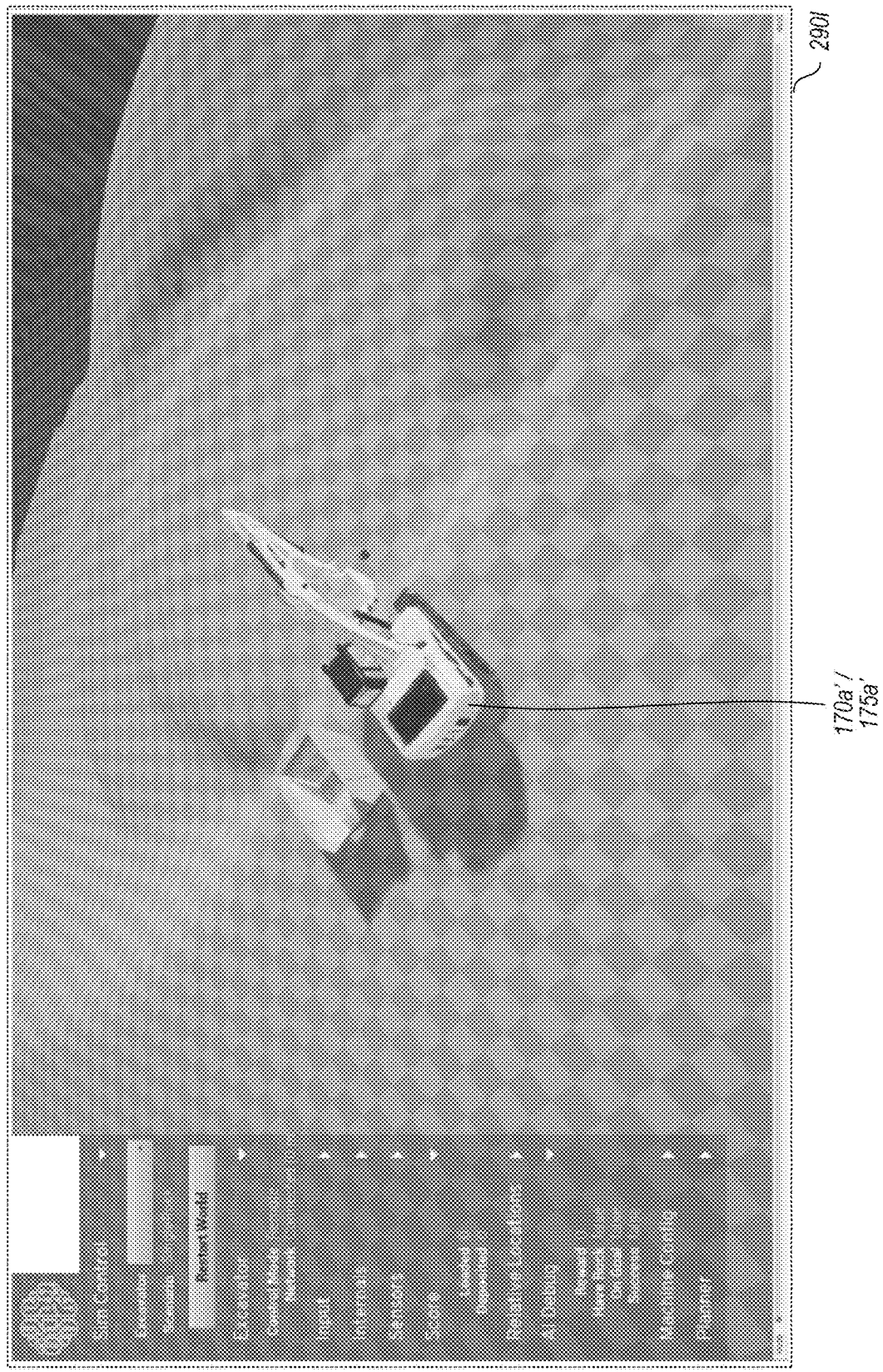
Figure 2M:
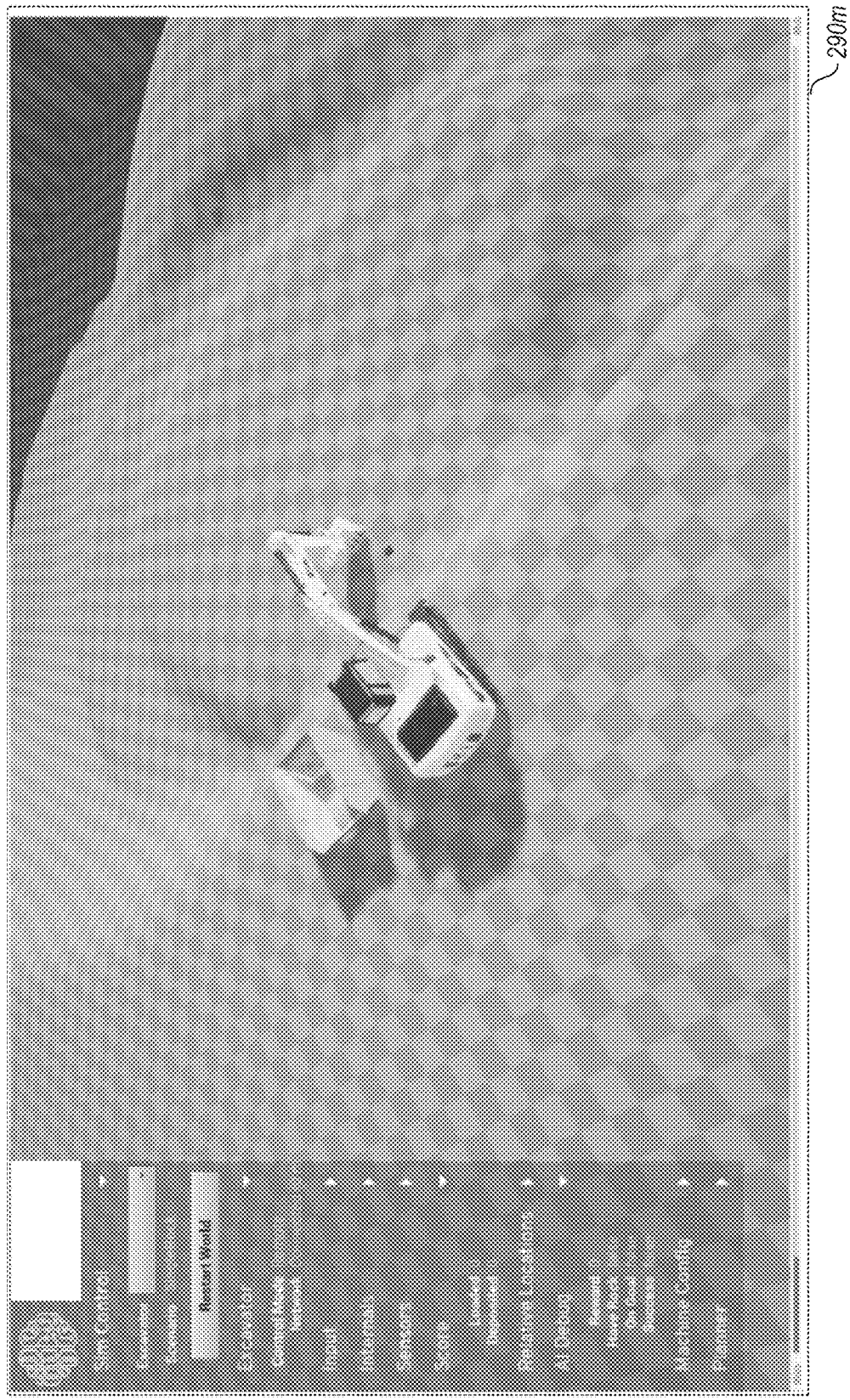
Figure 2N:
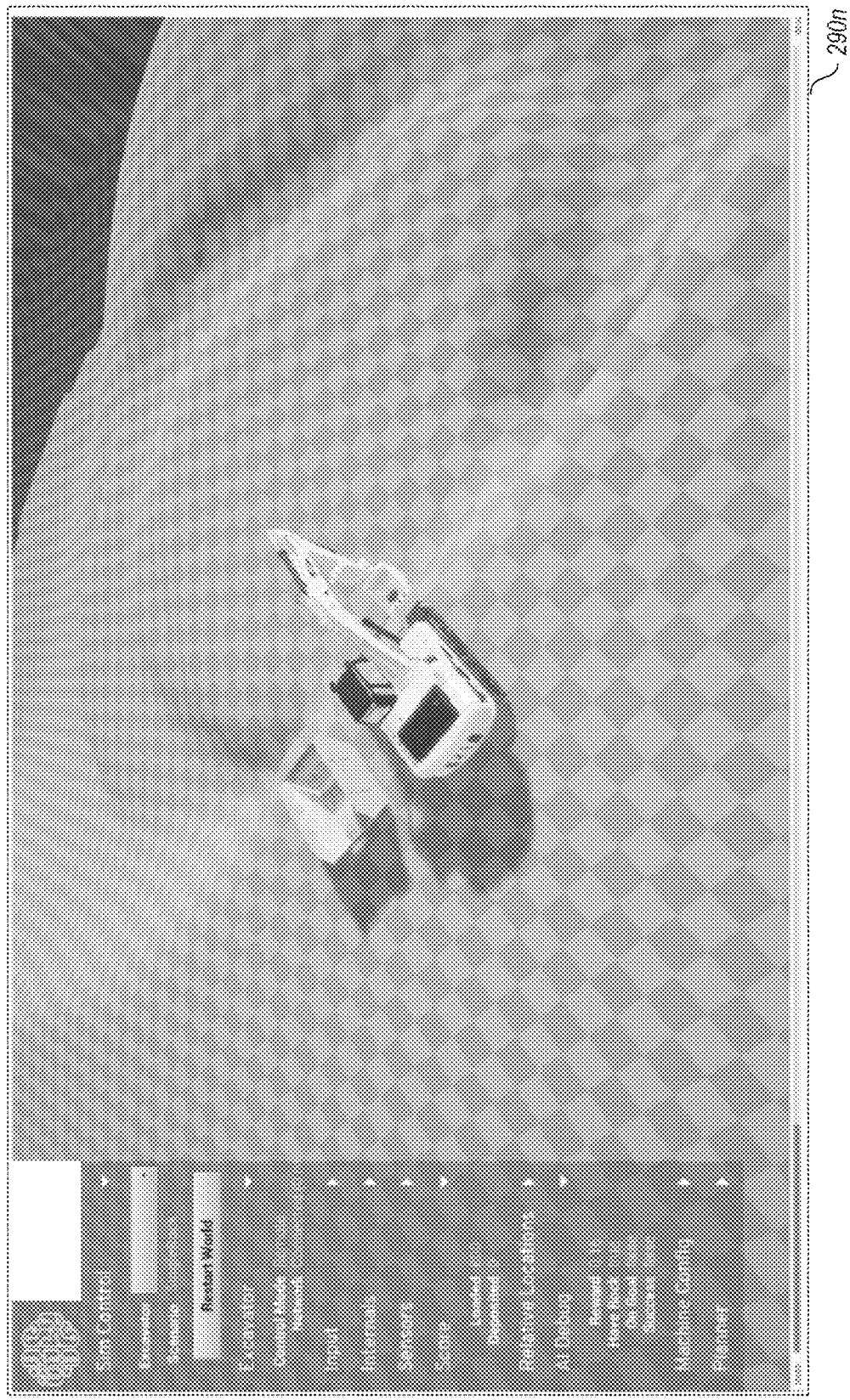
Figure 2P:
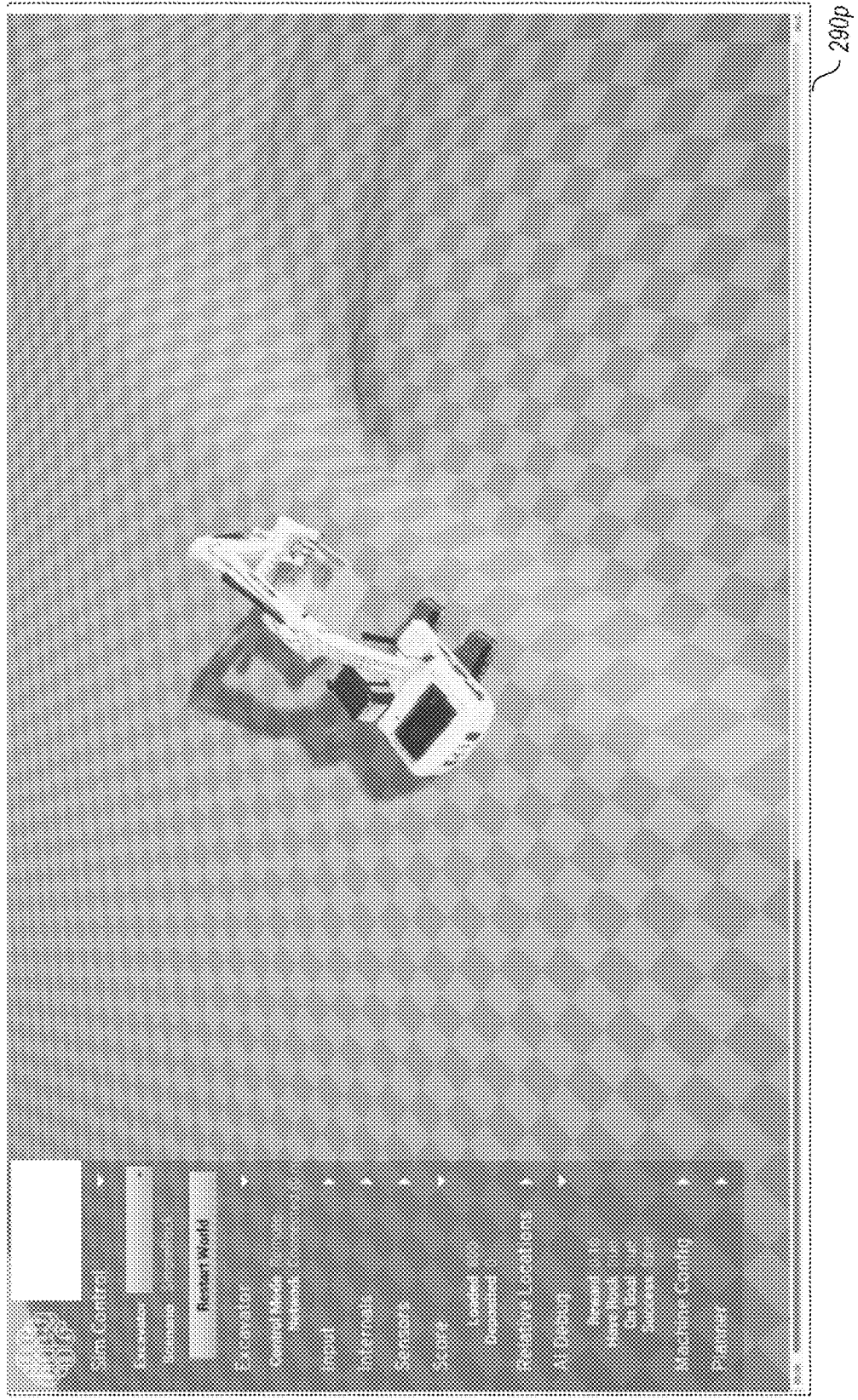
Figure 2Q:
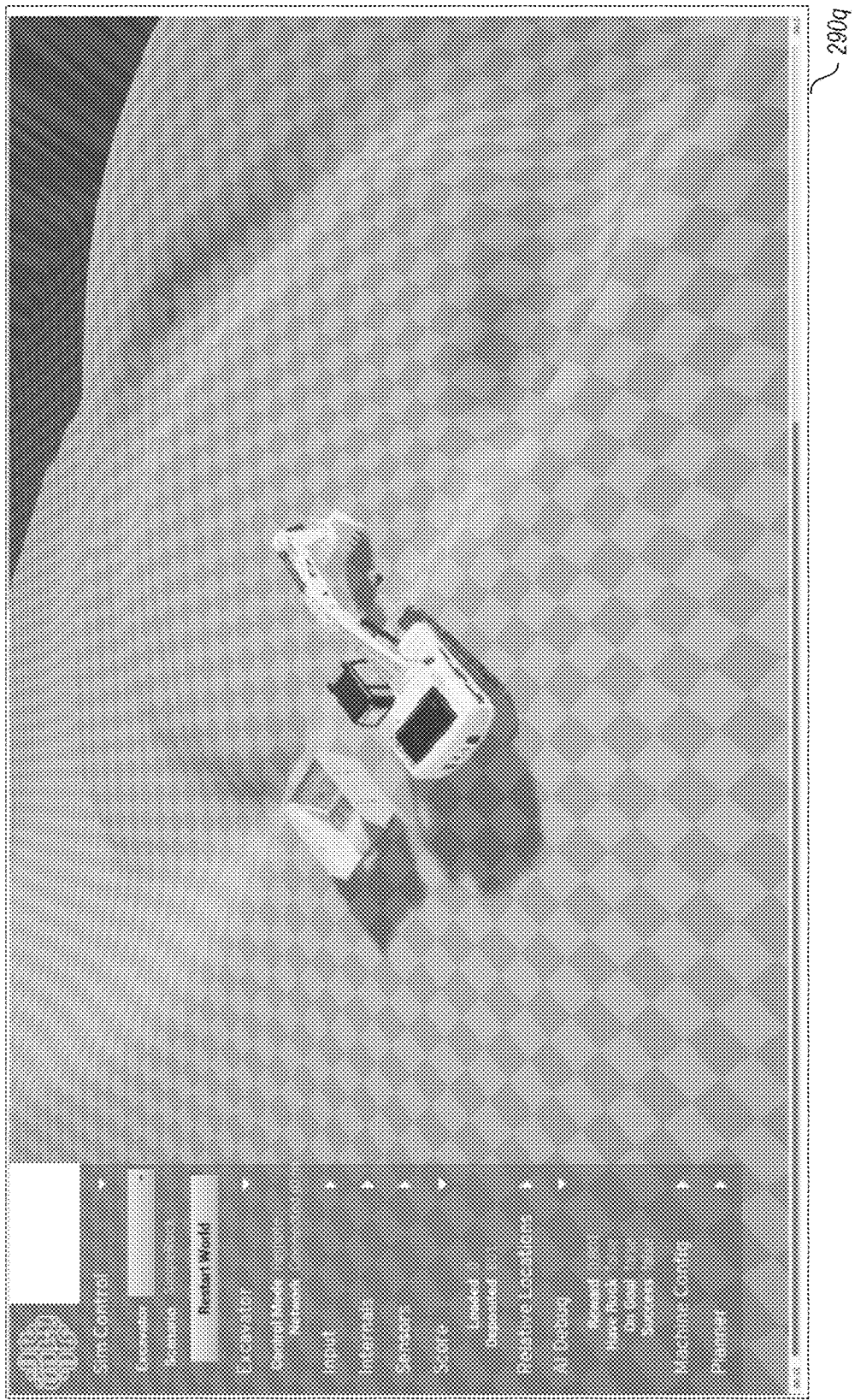

FIGS. 2L-2Q illustrate examples of performing simulations of operations of an earth-moving vehicle on a site and of gathering various corresponding simulation data (as discussed further with respect to FIG. 2K). In particular, FIG. 2L illustrates information 290l for a GUI of a simulation module that in the illustrated example is configured to repeatedly simulate operations of an earth-moving vehicle (in this example, an excavator vehicle) in performing a task that includes picking up a rock in a hole in front of the earth-moving vehicle and moving it to a goal location outside of the hole (e.g., a receptacle to the side of the earth-moving vehicle). The illustrated GUI includes various controls and information, such as to track the simulated activities of the earth-moving vehicle as it performs the task. FIGS. 2M through 2P illustrate further examples of information in the GUI as the simulated module performs a simulation of an episode of retrieving and moving the rock, illustrating information 290m-290p, respectively. In particular, FIG. 2M illustrates an example of moving the arm/bucket forward to a position that will allow retrieval of the rock, FIGS. 2N-2P illustrate, for example, that a 'Have Rock' state is changed to true once the rock has been successfully scooped up by the bucket of the earth-moving vehicle, and FIG. 2P further illustrates that a 'On Goal' state is changed to true once the rock is located above the receptacle (once the rock is dropped or otherwise placed into the receptacle, not shown here, the 'Success' state will further be turned to true, while the 'Have Rock' state will be returned to false). FIG. 2Q illustrates information 290q about an example of beginning a next episode to perform the same task (with the 'Have Rock', 'On Goal' and 'Success' states returned to false, but with Reward information being updated to indicate the successful performance of the task in the previous episode), but with the initial conditions varied, such as by having the initial rock placement in FIG. 2Q being different than that of FIG. 2L, and with the initial placement of the bucket being further to the right (when facing forward from the cabin) than that of FIG. 2M. It will be appreciated that such simulation activities may be performed for very large numbers of simulated episodes (e.g., hundreds, thousands, millions, etc.), and that a variety of other changes may be made to the simulation techniques in other embodiments.

FIG. 2K illustrates information 290k about one example of a format for recording actual and/or simulated operational data, such as for use in training a behavioral model or in other manners. In particular, FIG. 2K illustrates a table 275 that includes various rows 275a-275l illustrating earth-moving vehicle data (e.g., for an excavator vehicle, such as corresponding to the simulation activities discussed with respect to FIGS. 2L-2Q) at different time points (e.g., sampled every millisecond, every 10 ms, every 20 ms, every 30 ms, every 40 ms, every 50 ms, every 100 ms, every 200 ms, every second, etc.), and with various columns to illustrate recorded actual operational data or simulated operational data from each of the time points (e.g., for the first row in an episode to reflect state of the earth-moving vehicle and a target destination location for a task for the episode). In this example, the columns are as follows: the first three columns 'tilt_x', 'tilt_y' and 'tilt_z' illustrate positions of a point on the earth-moving vehicle (e.g., on the main body chassis, or the boom arm, or the stick arm, or the bucket or other attachment) at that time point and the next three columns 'angles_x', 'angles_y' and 'angles_z' represent an angular measurement of at least one of the boom arm relative to the main body chassis, or the stick arm relative to the boom arm, or the bucket (or other attachment) relative to the stick arm and/or boom arm, such as with the angular measurements determined for the actual operational data using inclinometer data and the position measurements determined for the actual operational data using an RTK-enabled GPS positioning unit; the next three columns 'bucket_x', 'bucket_y' and 'bucket_z' illustrate positions of a point on the bucket (or other attachment) of the earth-moving vehicle at that time point (e.g., the middle tip of the bucket), such as are determined for the actual operational data using an RTK-enabled GPS positioning unit and/or inclinometer data; the next three columns 'target_vec', 'target_vec' and 'target_vec' (shown in a separate area below the prior columns to enable the additional columns to be shown on a single page) illustrate information about one or more vectors to a target destination location (e.g., a target object or area) at that time point from one or more points of the earth-moving vehicle (e.g., the end of the bucket, the end of the stick arm, etc.), such as may be determined based on the difference between the target destination location and a current position of the corresponding earth-moving vehicle point(s); the next two columns 'have_rock' and 'on_goal' illustrate information about status of task completion at that time point (e.g., in a manner similar to that discussed with respect to FIGS. 2L-2Q); and the last three columns 'stick_end_xyz', 'stick_end_xyz' and 'stick_end_xyz' illustrate information about a position on the stick arm (e.g., at the end of the stick arm) at that time point, such as are determined for the actual operational data using an RTK-enabled GPS positioning unit and/or inclinometer data. The illustrated example rows are a small subset of the actual data for a single episode of performing a task, with rows 275g and onward in this example corresponding to a state at which the earth-moving vehicle has picked up the rock, and rows 275j and onward corresponding to a further state at which the earth-moving vehicle has moved the rock to a goal area or location. An episode may be defined in various manners in various embodiments (e.g., accomplishing one or more defined tasks, attempting to accomplish one or more defined tasks, operating for a defined period of time, etc.), and success may be defined in various manners in various embodiments, such as successfully picking up one or more rocks or other loads (e.g., without dropping the load), successfully moving one or more picked-up rocks or other loads to a goal location (e.g., without dropping the load), successfully depositing one or more picked-up rocks or other loads at a goal location, successfully reaching another type of defined result (e.g., creating a hole of a defined size and/or shape at a specified position), etc. In addition, a sliding window used for packing data may be a defined quantity of data (e.g., a defined quantity of rows), and the packing of such data may include concatenating data for each of the rows in a sliding window (e.g., for a sliding window corresponding to three rows, packing data for a first sliding window by storing data of row 1 followed by data of row 2 followed by data of row 3, and then packing data for a second sliding window by storing data of row 2 followed by data of row 3 followed by data of row 4, etc.). It will be appreciated that a variety of other types of data may be recorded and/or simulated in other embodiments, whether in addition to or instead of the illustrated types of data, and with respect to a variety of other types of sensors or other measurements.

Additional details about autonomous control of operations of one or more powered earth-moving vehicle are included in U.S. patent application Ser. No. 17/970,427, entitled "Autonomous Control Of On-Site Movement Of Powered Earth-Moving Construction Or Mining Vehicles" and filed Oct. 20, 2022; in U.S. patent application Ser. No. 17/893,423, entitled "Hardware Component Configuration For Autonomous Control Of Powered Earth-Moving Vehicles" and filed Aug. 23, 2022; in U.S. Provisional Patent Application No. 63/354,677, entitled "Proportional Pressure Control System For Autonomous Control Of Earth-Moving Construction And/Or Mining Vehicles" and filed Jun. 22, 2022; in U.S. Provisional Patent Application No. 63/433,731, entitled "Adaptive Control System For Autonomous Control Of Powered Earth-Moving Vehicles" and filed Dec. 19, 2022; in U.S. Patent Application No. 63/328,469, entitled "Autonomous Control Of Operations Of Earth-Moving Vehicles Using Trained Machine Learning Models" and filed Apr. 7, 2022; in U.S. Patent Application No. 63/350,149, entitled "Autonomous Control Of Operations Of Earth-Moving Vehicles Using Data From Simulated Vehicle Operation" and filed Jun. 8, 2022; each of which is hereby incorporated by reference in its entirety.

Various details have been provided with respect to FIGS. 2A-2Q, but it will be appreciated that the provided details are non-exclusive examples included for illustrative purposes, and other embodiments may be performed in other manners without some or all such details. For example, multiple types of sensors may be used to provide multiple types of data and the multiple data types may be combined and used in various ways in various embodiments, including non-exclusive examples of magnetic sensors and/or IMUs (inertial measurement units) to measure position data and whether in addition to or instead of the use of GPS and inclinometer data as discussed with respect to FIGS. 2A-2I.

Figure 3:
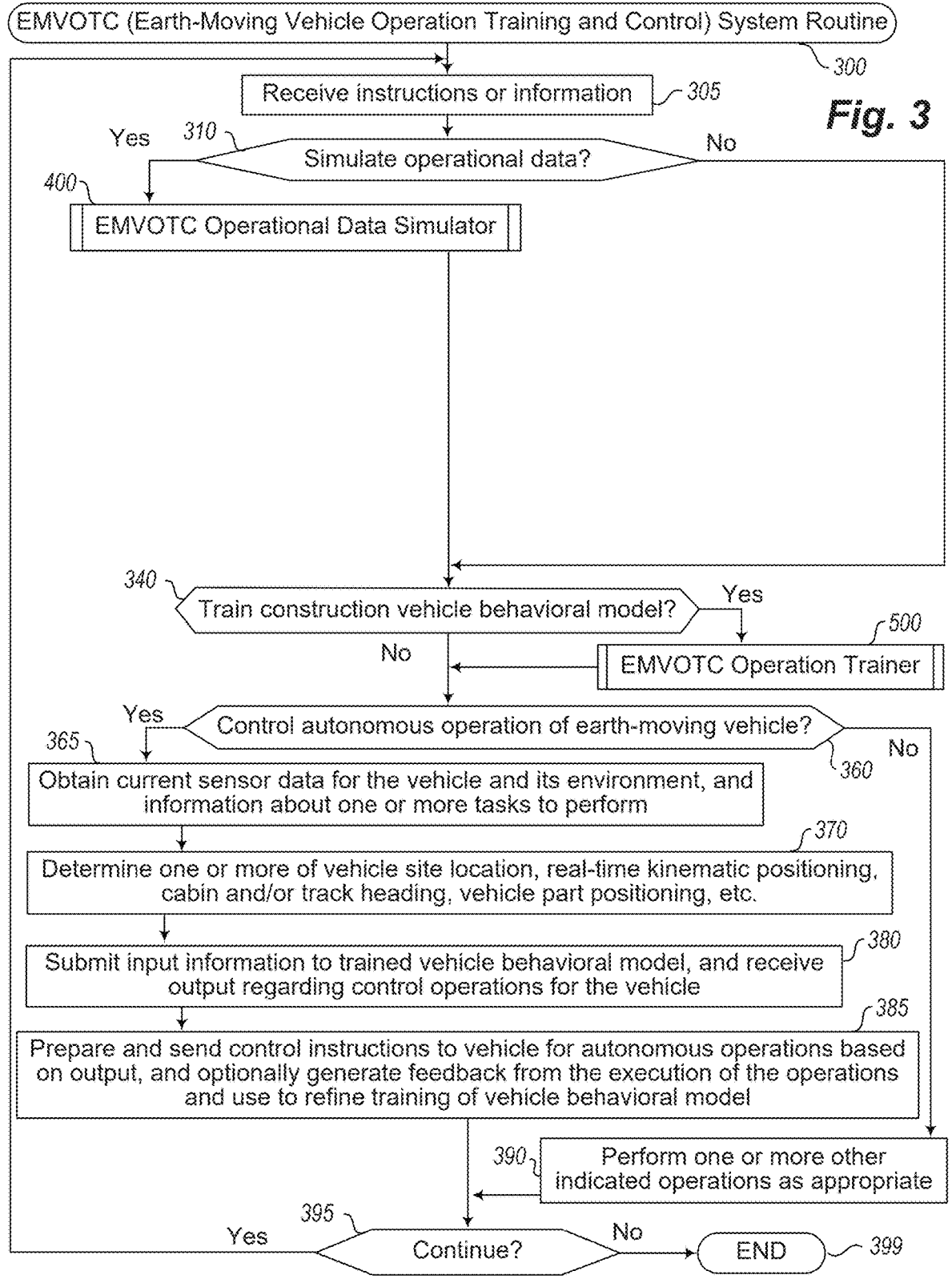
FIG. 3 is an example flow diagram of an illustrated embodiment of an Earth-Moving Vehicle Operation Training and Control (EMVOTC) System routine.

FIG. 3 is an example flow diagram of an illustrated embodiment of an EMVOTC (Earth-Moving Vehicle Operation Training and Control) System routine 300. The routine may be provided by, for example, execution of an embodiment of the EMVOTC system 140 of FIGS. 1A-1B and/or the EMVOTC system discussed with respect to FIGS. 2A-2Q and elsewhere herein, such as to perform automated operations for implementing autonomous control of earth-moving vehicles, including to automatically determine and control movement of an earth-moving vehicle's arm(s) and/or attachment(s) (e.g., digging bucket) to move materials or perform other actions, including in some embodiments by an EMVOTC system attached to (e.g., mounted on) and executing on an earth-moving vehicle being controlled (e.g., without interacting with any other computing devices or systems remote from the vehicle, other than to receive transmissions such as GPS signals and RTK correction data). While routine 300 is discussed with respect to controlling operations of a single earth-moving vehicle at a time, it will be appreciated that the routine 300 may be performed in other manners in other embodiments, including to control operations of multiple earth-moving vehicles on a job site, to be implemented by one or more configured devices or systems (optionally in multiple locations and/or operating in a distributed or otherwise coordinated manner, such as with a computing device local to an earth-moving vehicle performing some of the automated operations while one or more remote server systems in communication with that computing device perform additional portions of the routine), etc.

The routine 300 begins in block 305, where instructions or information is received (e.g., waiting at block 305 until such instructions or information is received). The routine continues to block 310 to determine whether the instructions or information received in block 305 indicate to generate simulated operational data (e.g., based on receiving an instruction to do so, receiving settings or parameters to use for the simulating provided in block 305 or previously specified, etc.), and if so continues to block 400 to perform an EMVOTC Operational Data Simulator module routine to generate and provide the simulated operational data, with one example of such a routine discussed in greater detail with respect to FIGS. 4A-4B. After block 400, or if it is instead determined in block 310 that the instructions or information received in block 305 do not indicate to generate simulated operational data, the routine 300 continues to block 340 to determine whether the instructions or information received in block 305 indicate to train an earth-moving vehicle behavioral model for an earth-moving vehicle (e.g., using simulated operational data generated in block 400, based on receiving other actual and/or simulated operational data to use for the training, using training-related settings or parameters provided in block 305 or previously specified, etc.), and if so continues to block 500 to perform an EMVOTC Operation Trainer module routine to generate and provide the simulated operational data, with one example of such a routine discussed in greater detail with respect to FIG. 5.

After block 500, or if it is instead determined in block 340 that the instructions or information received in block 305 do not indicate to train an earth-moving vehicle behavioral model, the routine 300 continues to block 360 to determine whether the instructions or information received in block 305 indicate to control autonomous operations of one or more earth-moving vehicles using one or more corresponding trained earth-moving vehicle behavioral models (e.g., a model trained in block 500), such as based on receiving one or more tasks and/or multi-task jobs to be implemented, and if so continues to perform blocks 365-385 to perform the autonomous operations control. In block 365, the routine obtains current status information for the earth-moving vehicle(s) (e.g., sensor data for the earth-moving vehicle(s) and the surrounding environment) and information about the one or more tasks to perform (e.g., as received in block 305). After block 365, the routine continues to block 370, where it determines information about the earth-moving vehicle (e.g., one or more of the earth-moving vehicle's location on the site, real-time kinematic positioning, cabin and/or track heading, positioning of parts of the earth-moving vehicle such as the arm(s)/bucket, etc.). In block 380, the routine then submits input information to a trained earth-moving vehicle behavioral model, and receives output from it corresponding to operations to be performed by the earth-moving vehicle(s) to perform the one or more tasks. In block 385, the routine then prepares and sends corresponding control instructions to the one or more earth-moving vehicles to initiate autonomous operations for performing the task(s) based on the output, and optionally generates feedback from the execution of the operations for use in subsequent refinement of the earth-moving vehicle behavioral model's training.

If it is instead determined in block 360 that the information or instructions received in block 305 are not to control automated operation of earth-moving vehicle(s), the routine continues instead to block 390 to perform one or more other indicated operations as appropriate. For example, the operations performed with respect to block 390 may include receiving and storing data and other information for subsequent use (e.g., actual and/or simulated operational data; sensor data; an overview workplan and/or other goals to be accomplished, such as for the entire project, for a day or other period of time, and optionally including one or more tasks to be performed; etc.), receiving and storing information about earth-moving vehicles on the job site (which vehicles are present and operational, status information for the vehicles, etc.), receiving and responding to requests for information available to the EMVOTC system (e.g., for use in a displayed GUI to an operator user that is assisting in activities at the job site and/or to an end user who is monitoring activities), receiving and storing instructions or other information provided by one or more users and optionally initiating corresponding activities, etc. While not illustrated here, in some embodiments the routine may perform further interactions with a client or other end user, such as before, during or after receiving or providing information in block 390, as discussed in greater detail elsewhere herein. In addition, it will be appreciated that the routine may perform operations in a synchronous and/or asynchronous manner (e.g., while waiting for responses from blocks 400 and/or 500).

After blocks 385 or 390, the routine continues to block 395 to determine whether to continue, such as until an explicit indication to terminate is received, or instead only if an explicit indication to continue is received. If it is determined to continue, the routine returns to block 305, and otherwise continues to block 399 and ends.

Figure 4A:
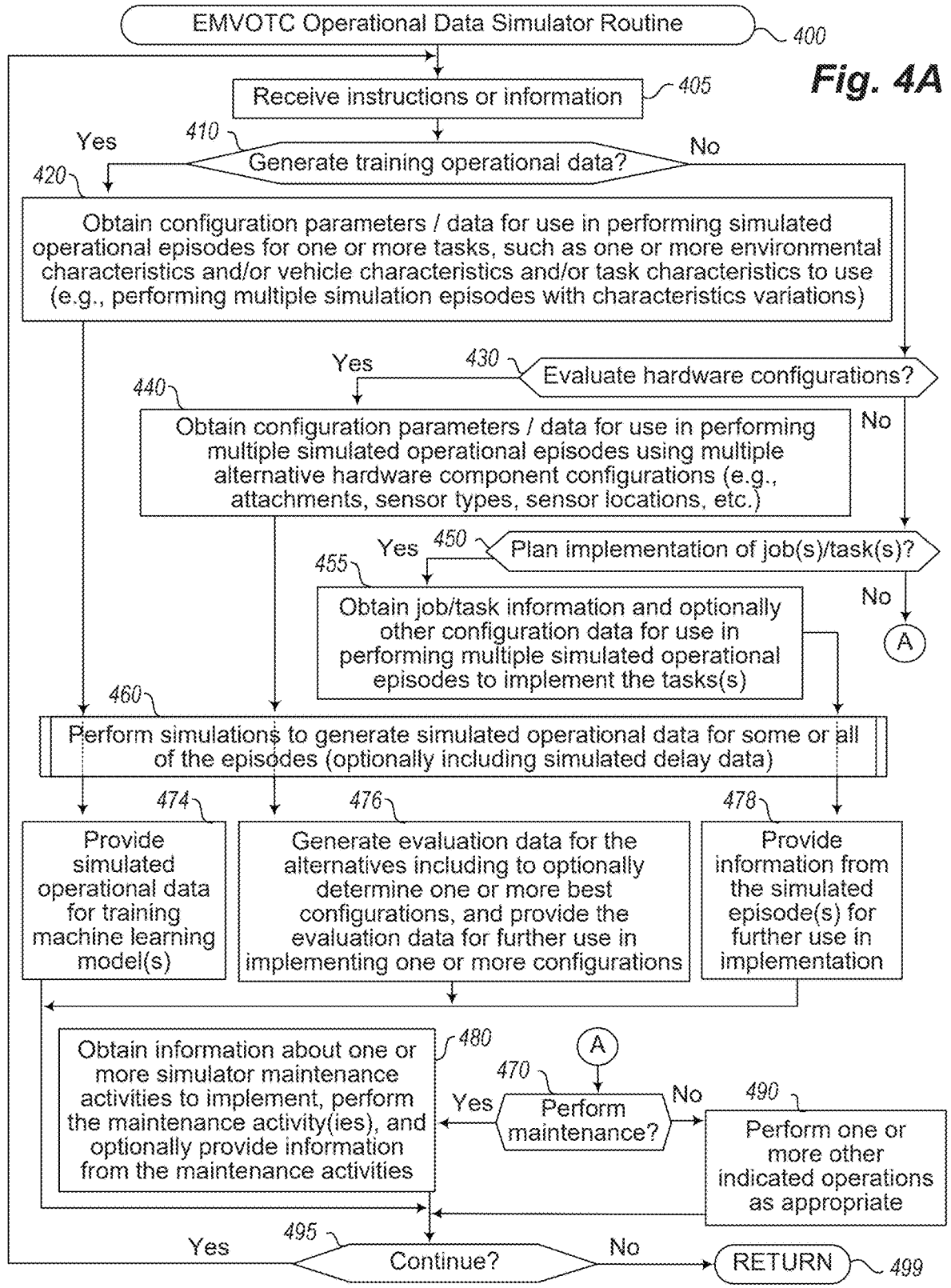

FIGS. 4A-4B are an example flow diagram of an illustrated embodiment of a EMVOTC Operational Data Simulator Module routine 400. The routine may be provided by, for example, execution of an embodiment of the EMVOTC Operational Data Simulator module 147 of FIGS. 1A-1B and/or the operational data simulator module discussed with respect to FIGS. 2A-2Q and elsewhere herein, such as to perform automated operations for generating simulated operational data by simulating operations of one or more types of earth-moving vehicles and/or one or more particular earth-moving vehicles (e.g., with specified attachments and/or other hardware component configurations, environmental conditions, etc.). In some situations, routine 400 is invoked from routine 300 of FIG. 3, and returns to that invocation point when the routine 400 concludes. While routine 400 is discussed with respect to simulating operations of a single earth-moving vehicle at a time, it will be appreciated that the routine 400 may be performed in other manners in other embodiments, including to simulate operations of multiple earth-moving vehicles and/or types of earth-moving vehicles (e.g., multiple earth-moving vehicles operating in concert).

The routine 400 begins in block 405, where instructions or information is received (e.g., waiting at block 405 until such instructions or information is received). The routine continues to block 410 to determine whether the instructions or information received in block 405 indicate to perform simulated operations of one or more earth-moving vehicles to generate simulated operational data for use in training one or more vehicle behavioral models, and if so continues to block 420 to obtain and use configuration parameters or other configuration data for use in performing one or more simulated operational episodes (e.g., multiple simulated operational episodes having alternative factors and/or conditions, such as variations in earth-moving vehicle configurations and/or task(s) to be performed and/or environmental conditions for use as an input start state/conditions and/or changing state/conditions, etc.). The routine then proceeds to perform a subroutine at block 460 to generate corresponding simulated operational data using the specified configuration data, and then proceeds to block 474 to use the simulated operational data in training one or more corresponding machine learning behavioral models—an example embodiment of the subroutine performed at block 460 is discussed in greater detail in FIG. 4B with respect to blocks 462-472. In particular, at block 462 the subroutine obtains data to use for the simulation, such as information about one or more tasks to perform, configuration data to use during the simulation (e.g., the configuration data from block 420), an indicated earth-moving vehicle or vehicle type, etc. In block 464, the subroutine obtains kinematics information for the vehicle or vehicle type (e.g., as indicated in block 462, for a default vehicle or vehicle type, etc.), such as in the form of differential equations to model vehicle movement and physics of interactions of the vehicle with a surrounding environment. In block 466, the subroutine optionally generates information about variations to use in different simulation episodes, such as variations in vehicle hardware configuration (e.g., attachments, sensor types and/or locations, vehicle propulsion mechanism, etc.) and other vehicle characteristics (e.g., position, velocity, acceleration, power level, coefficient of internal friction of a moveable vehicle part, etc.), environmental characteristics (e.g., initial and/or changing conditions, such as with respect to terrain depth, material density, material hardness, material composition, material viscosity, material moisture content, material coefficient of friction, wind speed, wind direction, rain or other precipitation, etc.), task type, etc. In block 468, the subroutine then performs the simulation activities using the information obtained in blocks 462-466, such as to apply motion/material physics and kinematics information to determine simulated movement responses of the default or earth-moving vehicle or vehicle type to simulated inputs to the vehicle controls, including using variations (if any) for multiple simulation episodes, and optionally generating and adding delay (e.g., related to a virtual human operator in manipulating the vehicle controls, of the virtual earth-moving vehicle in responding to manipulated vehicle controls, etc.). In block 470 the subroutine then optionally generates visualizations for some or all of the simulated operations, and presents or otherwise provides the generated visualizations, before continuing to block 472 and returning.

If it is instead determined in block 410 that the instructions or information received in block 405 do not indicate to generate simulated operational data for use in training one or more behavioral models, the routine 400 continues to block 430 to determine whether the instructions or information received in block 405 indicate to perform simulated operations of one or more earth-moving vehicles to evaluate alternative hardware configurations, and if so continues to block 440 to obtain configuration parameters or other configuration data for use in performing multiple simulated operational episodes using multiple alternative hardware configurations, before proceeding to perform the subroutine at block 460 to generate corresponding simulated operational data using the specified configuration data from block 440. The routine then proceeds to block 476 to evaluate performance of the different alternatives with respect to one or more metrics (e.g., optionally ranking the alternatives or otherwise selecting one or more top or best alternatives), and provide corresponding evaluation information and/or other simulated operational data for further use in implementing one or more corresponding hardware configurations on one or more actual earth-moving vehicles. If it is instead determined in block 430 that the instructions or information received in block 405 do not indicate to evaluate alternative hardware configurations, the routine 400 continues to block 450 to determine whether the instructions or information received in block 405 indicate to perform simulated operations of one or more earth-moving vehicles to plan implementation of one or more tasks and/or multi-task jobs, such as by generating and evaluating variations in the task(s), and if so continues to block 455 to obtain configuration parameters or other configuration data about the task(s) and/or job(s), before proceeding to perform the subroutine at block 460 to generate corresponding simulated operational data for multiple simulated operational episodes that implement the task(s) and/or job(s) using multiple alternative factors and/or conditions (e.g., variations in earth-moving vehicle configurations and/or environmental conditions and/or input state/initial conditions, etc.), using the specified configuration data from block 455. The routine then proceeds to block 479 to optionally evaluate performance of the different alternatives with respect to one or more metrics (e.g., optionally ranking the alternatives or otherwise selecting one or more top or best alternatives), and provide corresponding evaluation information and/or other simulated operational data for further use in performing an actual implementation of the task(s) and/or job(s).

If it is instead determined in block 450 that the instructions or information received in block 405 do not indicate to plan implementations of task(s) and/or job(s), the routine 400 continues to block 470 to determine whether the instructions or information received in block 405 indicate to perform one or more maintenance operations for the simulator module, and if so continues to block 480 to obtain information about one or more simulator maintenance activities to perform, perform the maintenance activities, and optionally provide information about performance of the maintenance activities.

If it is instead determined in block 470 that the information or instructions received in block 405 are not to perform maintenance activities, the routine continues instead to block 490 to perform one or more other indicated operations as appropriate. For example, the operations performed with respect to block 490 may include receiving and storing data and other information for subsequent use (e.g., settings and parameters to be used; etc.), receiving and storing information about earth-moving vehicles (kinematics movement dynamics, etc.), receiving information about differences between simulated vehicle operations and actual vehicle operations using the same configurations and using to update the simulation activities to reduce or eliminate the differences, receiving and responding to requests for information available to the simulator module (e.g., for use in a displayed GUI), receiving and storing instructions or other information provided by one or more users and optionally initiating corresponding activities, etc. While not illustrated here, in some embodiments the routine may perform further interactions with a client or other end user, such as before, during or after receiving or providing information in block 490, as discussed in greater detail elsewhere herein. In addition, it will be appreciated that the routine may perform operations in a synchronous and/or asynchronous manner.

After blocks 420, 440, 460, 480 or 490, the routine continues to block 495 to determine whether to continue, such as until an explicit indication to terminate is received, or instead only if an explicit indication to continue is received. If it is determined to continue, the routine returns to block 405, and otherwise continues to block 499 and returns (e.g., to another routine, such as routine 300, from which the routine 400 is invoked).

FIG. 5 is an example flow diagram of an illustrated embodiment of a EMVOTC Operation Trainer Module routine 500. The routine may be provided by, for example, execution of an embodiment of the EMVOTC Operational Data Determiner module 141 and/or EMVOTC Operation Trainer module 143 of FIGS. 1A-1B and/or the operational data determiner and/or operational trainer module discussed with respect to FIGS. 2A-2Q and elsewhere herein, such as to perform automated operations for obtaining, preparing and using actual and/or simulated operational data for one or more earth-moving vehicles to train one or more corresponding machine learning behavioral models. In some situations, routine 500 is invoked from routine 300 of FIG. 3, and returns to that invocation point when the routine 500 concludes. While routine 500 is discussed with respect to training a single vehicle behavioral model at a time, it will be appreciated that the routine 500 may be performed in other manners in other embodiments, including to train multiple vehicle behavioral models corresponding to multiple earth-moving vehicles and/or types of earth-moving vehicles (e.g., multiple earth-moving vehicles operating in concert).

The routine 500 begins in block 515, where it creates a new earth-moving vehicle behavioral model to be trained or obtains an existing earth-moving vehicle behavioral model (e.g., already at least partially trained). In block 520, the routine then obtains actual operational data from manual operation of one or more earth-moving vehicles in multiple episodes of performing one or more tasks (e.g., including actual sensor data for the earth-moving vehicle and its environment, corresponding actual manual control data for the earth-moving vehicle and resulting vehicle movements, etc.), and in block 525 similarly obtains data from simulated operation of one or more earth-moving vehicles in multiple episodes of performing the one or more tasks (e.g., such as from an operational data simulator module 147, and optionally including simulated sensor data for the earth-moving vehicle and its environment, corresponding simulated control data for the earth-moving vehicle and resulting simulated vehicle movement, etc.). It will be appreciated that the actual and simulated operational data may be previously generated and stored and/or may be concurrently generated, and that the routine may perform other operations in an asynchronous manner while waiting for data to be generated. After block 525, the routine continues to block 530 to prepare the obtained actual and simulated operational data for use in training activities, including to perform one or more of the following actions: remove data unrelated to actual operational training activities; sample data to reduce the size and/or to prevent overfitting; pack data using a sliding window technique; randomize the order of data for different episodes (e.g., to intermix actual and simulated data); normalize the data; etc. After block 530, the routine continues to block 535, where it performs activities to use the prepared simulated and actual operational data to train the earth-moving vehicle behavioral model, including to optionally use error/loss back propagation to refine the training of the model (e.g., to adjust weights of a neural network used to implement the model), and/or to use an excluded data set to validate the trained model. After block 535, the routine continues to block 599 and returns (e.g., to another routine, such as routine 300, from which the routine 500 is invoked). In addition, it will be appreciated that the routine may perform operations in a synchronous and/or asynchronous manner.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A system comprising:
one or more hardware processors; and
one or more memories with software instructions that, when executed by the one or more hardware processors, perform automated operations including at least:
implementing functionality of an earth-moving vehicle simulator system that simulates operations of a virtual earth-moving vehicle of an indicated type performing at least one of construction or mining activities, the implementing of the functionality of the earth-moving vehicle simulator system including at least:
receiving parameters for use in simulating performance by the virtual earth-moving vehicle of one or more indicated tasks for the at least one of the construction or mining activities, the one or more parameters including at least one of multiple vehicle characteristics of the virtual earth-moving vehicle, and at least one of multiple environmental characteristics of an environment under or around at least some of the virtual earth-moving vehicle, wherein the multiple environmental characteristics include terrain depth and material density and material hardness and material composition and material viscosity and material moisture content and material coefficient of friction and wind speed and wind direction, and wherein the multiple vehicle characteristics include, for at least part of the virtual earth-moving vehicle, position and velocity and acceleration and power level and coefficient of internal friction of a moveable part of the virtual earth-moving vehicle; and
generating simulated operational data for the performance by the virtual earth-moving vehicle of the one or more indicated tasks based at least in part on the received parameters, the simulated operational data including predicted movements for the virtual earth-moving vehicle of at least one of a cabin or a chassis or a hydraulic arm or an attachment in response to manipulations of simulated controls of the virtual earth-moving vehicle, and the generating of the simulated operational data using a set of differential equations modeling at least kinematics information for the virtual earth-moving vehicle, and further including generating time delay noise variations for the simulated operational data to represent delay of a virtual human operator in performing the manipulations of the simulated controls;
implementing functionality of an earth-moving vehicle trainer system that uses machine learning to train one or more behavioral models for use in controlling operations of actual earth-moving vehicles of the indicated type, including using the generated simulated operational data and actual operational data for training the one or more behavioral models, wherein the actual operational data is from one or more actual earth-moving vehicles of the indicated type and includes human operator inputs to controls of the one or more actual earth-moving vehicles and further includes respective tracked movements for the one or more actual earth-moving vehicles of at least one of a cabin or a chassis or a hydraulic arm or an attachment; and
implementing functionality of an earth-moving vehicle operation training and control system that controls autonomous operations of at least one actual earth-moving vehicle of the indicated type, including using at least one of the trained behavioral models and information about at least one indicated task to send control instructions to controls of the at least one earth-moving vehicle to cause performance of the at least one indicated task.

2. The system of claim 1 wherein the indicated type of earth-moving vehicle is at least one of a type of excavator vehicle, or a type of bulldozer, or a type of truck, or a type of loader vehicle, wherein the virtual earth-moving vehicle and the at least one actual earth-moving vehicle each includes a tool attachment that is at least one of a claw or a bucket or a blade, and wherein the generating of the simulated operational data includes determining multiple variations to implement in at least one of the one or more indicated tasks, or the at least one of the one or more vehicle characteristics or the one or more environmental characteristics, and implementing multiple simulation episodes that each uses at least one of the multiple variations.

3. The system of claim 1 further comprising the at least one actual earth-moving vehicle.

4. A system comprising:
one or more hardware processors; and
one or more memories with software instructions that, when executed by the one or more hardware processors, perform automated operations involving simulating operations of a virtual earth-moving vehicle of an indicated type performing at least one of construction or mining activities, the automated operations including at least:
receiving one or more parameters for use in simulating performance by the virtual earth-moving vehicle of one or more indicated tasks for the at least one of the construction or mining activities, the one or more parameters including at least one of one or more vehicle characteristics of the virtual earth-moving vehicle, or of one or more environmental characteristics of an environment under or around at least some of the virtual earth-moving vehicle;
generating simulated operational data for the performance by the virtual earth-moving vehicle of the one or more indicated tasks based at least in part on the received one or more parameters, the simulated operational data including predicted movements for the virtual earth-moving vehicle of at least one of a cabin or a chassis or a hydraulic arm or an attachment in response to manipulations of simulated controls of the virtual earth-moving vehicle, and the generating of the simulated operational data using a set of differential equations modeling at least kinematics information for the virtual earth-moving vehicle, and further including generating time delay noise variations for the simulated operational data to represent delay of a virtual human operator in performing the manipulations of the simulated controls; and
providing the generated simulated operational data for further use.

5. The system of claim 4 wherein the generating of the simulated operational data includes determining multiple variations to implement in at least one of the one or more indicated tasks, or the at least one of the one or more vehicle characteristics or the one or more environmental characteristics, and implementing multiple simulation episodes that each uses at least one of the multiple variations.

6. The system of claim 4 wherein the received one or more parameters include two or more of multiple environmental characteristics of the environment under or around at least some of the virtual earth-moving vehicle, the multiple environmental characteristics including terrain depth and material density and material hardness and material composition and material viscosity and material moisture content and material coefficient of friction and wind speed and wind direction.

7. The system of claim 4 wherein the received one or more parameters include two or more of multiple vehicle characteristics of the virtual earth-moving vehicle, the multiple vehicle characteristics including, for at least part of the virtual earth-moving vehicle, position and velocity and acceleration and power level and coefficient of internal friction of a moveable part of the virtual earth-moving vehicle.

8. The system of claim 4 wherein the received one or more parameters include at least one of the vehicle characteristics and at least one of the environmental characteristics.

9. The system of claim 4 wherein the automated operations further include:
training, using machine learning, one or more behavioral models for use in controlling operations of earth-moving vehicles of the indicated type, wherein the training uses the generated simulated operational data and further uses actual operational data from one or more actual earth-moving vehicles of the indicated type, the actual operational data including human operator inputs to controls of the one or more actual earth-moving vehicles and further including respective tracked movements for the one or more actual earth-moving vehicles of at least one of a cabin or a chassis or a hydraulic arm or an attachment; and
providing the further trained one or more behavioral models for use in controlling one or more actual earth-moving vehicles of the indicated type.

10. The system of claim 9 further comprising:
an operator input control of an actual earth-moving vehicle of the indicated type, to capture an action-space involving human actuation of the operator input control that includes computing forces and counter-forces; and
a logging mechanism to track movements of the actual earth-moving vehicle that include data about weight, position, angle, and sensor input,
and wherein the actual operational data is based at least in part on the action-space from the human actuation and the tracked movements.

11. The system of claim 4 wherein the one or more parameters indicate multiple alternative hardware configurations of the virtual earth-moving vehicle that include variations in at least one of an attachment tool of the virtual earth-moving vehicle, or of one or more types of sensors on the virtual earth-moving vehicle, or one or more locations of sensors on the virtual earth-moving vehicle, and wherein the automated operations further include implementing multiple simulation episodes that each uses at least one of the variations, and evaluating the multiple alternative hardware configurations with respect to one or more defined metrics and based at least in part on results of the multiple simulation episodes, and providing information about the evaluating for further use.

12. The system of claim 4 wherein the one or more parameters indicate multiple variations in the one or more indicated tasks, and wherein the automated operations further include implementing multiple simulation episodes that each uses at least one of the variations, and evaluating the multiple variations with respect to one or more defined metrics and based at least in part on results of the multiple simulation episodes, and providing information about the evaluating for further use.

13. The system of claim 4 further comprising a plurality of stored earth-moving vehicle behavioral models that are generated based on real-world modeling of operations of one or more types of earth-moving vehicles that include the indicated type, wherein each earth-moving vehicle behavioral model includes information about operations of a cabin, a chassis, one or more arms and an attachment, and wherein the automated operations further include using the plurality of stored earth-moving vehicle behavioral models to control autonomous operations of multiple earth-moving vehicles of the one or more types.

14. The system of claim 4 further comprising at least one of:
an Internet-accessible module for performing maintenance of a simulator system that performs the automated operations; or
a virtual reality (VR) system including VR glasses and a VR engine to receive and present data generated by the automated operations; or
a planner interface for receiving instructions from a planner module to supply the one or more parameters and to actuate at least some of the automated operations; or
an application enabling a user to obtain replays of plans and sensor data.

15. The system of claim 4 wherein the indicated type of earth-moving vehicle is at least one of a type of excavator vehicle, or a type of bulldozer, or a type of truck, or a type of loader vehicle, and wherein the virtual earth-moving vehicle includes a tool attachment that is at least one of a claw or a bucket or a blade.

16. A computer-implemented method comprising:
generating, by one or more computing systems, data about simulated operations of an earth-moving vehicle of an indicated type by implementing a plurality of episodes each involving simulated performance of a specified task for at least one of a construction activity or a mining activity, wherein the plurality of episodes involve variations in at least one of environmental characteristics of an environment in which the earth-moving vehicle operates, or of vehicle characteristics of the earth-moving vehicle, or of attributes of the specified task, and wherein the simulated operations of the earth-moving vehicle for the performance of the specified task for each of the plurality of episodes includes simulated inputs to one or more controls of the earth-moving vehicle and resulting movements of at least one of an arm or an attachment or a cabin or a chassis of the earth-moving vehicle, and wherein the generating of the data about the simulated operations includes adding time delays during the simulated operations to represent delay of a human operator in performing manipulations of the controls corresponding to the simulated inputs; and
providing, by the one or more computing systems, the generated data about the simulated operations, to cause further activities involving one or more actual earth-moving vehicles of the indicated type.

17. The computer-implemented method of claim 16 wherein the generating of the data about the simulated operations further includes adding additional time delays during the simulated operations to represent delay of the earth-moving vehicle in responding to the manipulations of the controls.

18. The computer-implemented method of claim 16 wherein the providing of the generated data about the simulated operations includes using the generated data about the simulated operations to perform training of one or more earth-moving vehicle behavioral models that represent operations of the indicated type of earth-moving vehicles or of a particular earth-moving vehicle of the indicated type, wherein the training uses machine learning, and wherein each earth-moving vehicle behavioral model includes information about operations of at least one of a cabin, a chassis, one or more arms or an attachment.

19. The computer-implemented method of claim 18 further comprising obtaining actual data from actual operations of one or more earth-moving vehicles of the indicated type by one or more human operator users, and wherein the training further includes using the actual data in combination with the generated data about the simulated operations.

20. The computer-implemented method of claim 18 further comprising, after the training of the one or more earth-moving vehicle behavioral models, implementing autonomous operations of one or more actual earth-moving vehicles of the indicated type under control of at least one of the trained earth-moving vehicle behavioral models.

21. The computer-implemented method of claim 16 further comprising receiving input about multiple alternative hardware component configurations of the earth-moving vehicle of the indicated type, wherein the generating of the data about the simulated operations includes evaluating the multiple alternative hardware component configurations while having the earth-moving vehicle of the indicated type complete the simulated performance of the specified task, and wherein the providing of the generated data about the simulated operations includes providing evaluation information from the evaluating to cause implementation of at least one of the alternative hardware component configurations on an actual earth-moving vehicle of the indicated type.

22. The computer-implemented method of claim 16 further comprising receiving input about multiple alternative implementations, by the earth-moving vehicle of the indicated type, of multiple tasks that include the specified task, wherein the generating of the data about the simulated operations includes evaluating the multiple alternative implementations by having the earth-moving vehicle of the indicated type complete the simulated performance of the multiple tasks, and wherein the providing of the generated data about the simulated operations includes providing evaluation information from the evaluating to use at least one of the alternative implementations on an actual earth-moving vehicle of the indicated type.

23. The computer-implemented method of claim 16 further comprising receiving input from one or more users to explore multiple variations of simulated performance of at least the specified task by at least the earth-moving vehicle of the indicated type, wherein the generating of the data about the simulated operations includes having the at least earth-moving vehicle of the indicated type complete the simulated performance of the at least specified task for the multiple variations, and wherein the providing of the generated data about the simulated operations includes providing information to the one or more users about the simulated performance for the multiple variations to cause further use of at least one of the multiple variations.

* * * * *